United States Patent
Rajagopalan et al.

(10) Patent No.: US 7,312,298 B2
(45) Date of Patent: Dec. 25, 2007

(54) FLUORINATED REACTIVE COMPOSITIONS FOR GOLF BALLS

(75) Inventors: Murali Rajagopalan, South Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 371 days.

(21) Appl. No.: 11/072,587

(22) Filed: Mar. 4, 2005

(65) Prior Publication Data

US 2006/0199938 A1    Sep. 7, 2006

(51) Int. Cl.
*A63B 37/12* (2006.01)
*A63B 37/00* (2006.01)
*C08G 18/44* (2006.01)

(52) U.S. Cl. .................... 528/70; 473/374; 473/378

(58) Field of Classification Search ............... None
See application file for complete search history.

(56) References Cited

U.S. PATENT DOCUMENTS

| | | | |
|---|---|---|---|
| 5,026,814 A * | 6/1991 | Re et al. .................. 528/61 |
| 5,744,549 A | 4/1998 | Lutz | |
| 6,943,213 B2 * | 9/2005 | Kuntimaddi ............. 525/127 |
| 2003/0073515 A1 * | 4/2003 | Yokota .................... 473/378 |
| 2004/0225100 A1 * | 11/2004 | Rajagopalan et al. ...... 528/44 |
| 2005/0038190 A1 * | 2/2005 | Kuntimaddi ............. 525/123 |
| 2006/0199937 A1 * | 9/2006 | Rajagopalan et al. ...... 528/70 |

* cited by examiner

*Primary Examiner*—David J. Buttner
(74) *Attorney, Agent, or Firm*—William B. Lacy

(57) ABSTRACT

A golf ball is disclosed, comprising: a core, the core having a diameter of 1.5 inches to 1.65 inches and a first coefficient of restitution of 0.8 or greater at 125 ft/s; an intermediate layer disposed about the core, the intermediate layer having a first Shore D hardness of 20 to 80 and comprising a blend of two or more ionomers; and an outer cover layer disposed about the intermediate layer; the outer cover layer having a thickness of 0.005 inches to 0.05 inches and a second Shore D hardness of 30 to 70, the outer cover layer being composed of a castable material formed from reactants comprising at least one fluorinated polyfunctional compound, wherein the golf ball has a second coefficient of restitution of 0.8 or greater at 125 ft/s and a compression of 50 to 120.

9 Claims, No Drawings

FLUORINATED REACTIVE COMPOSITIONS FOR GOLF BALLS

FIELD OF INVENTION

The present disclosure is directed to golf balls and, more particularly, to novel fluorinated reactive liquid compositions for use in golf balls and golf ball structures formed therefrom.

BACKGROUND OF INVENTION

Golf balls can be formed from a variety of compositions. Balata, a natural or synthetic trans-polyisoprene rubber, has been used to form golf ball covers. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, conventional polyurethane covers do not match ionomer covers with respect to resilience or rebound. Unsaturated components (such as aromatic diisocyanate, aromatic polyol, and/or aromatic polyamine) used in a polyurethane or polyurea composition may at least in part attribute to the composition's susceptibility to discoloration and degradation upon exposure to thermal and actinic radiation, such as ultraviolet (UV) light. Conventional polyurethane covers can be prone to absorption of moisture, which is another mechanism through which desirable physical properties in the cover may be compromised. Moisture passed through the cover may further deteriorate physical and performance properties of the core.

Therefore, a continuing need remains for novel material compositions usable in forming golf ball portions (e.g., covers) having desirable and/or optimal combination of physical and performance characteristics, such as being resistant to moisture absorption. Partially or fully fluorinated polyurethanes and polyureas, such as those disclosed herein, have superior and desirable resistance to moisture absorption, and may be suitable for forming one or more portions of the golf ball.

SUMMARY OF INVENTION

The present disclosure is directed to a golf ball comprising a core and a layer about the core, wherein the layer may be an outer cover layer or an intermediate layer between the core and an outer cover layer. The core may have a coefficient of restitution of 0.8 or greater at 125 ft/s. The golf ball may have a coefficient of restitution of 0.8 or greater at 125 ft/s. The layer may have a thickness of 0.005 inches or greater. The layer may be formed from a composition comprising at least one fluorinated polyahl (e.g., polyol, polyamine, or aminoalcohol) having primary hydroxyl group, secondary hydroxyl group, tertiary hydroxyl group, primary amine group, secondary amine group, or a combination thereof. The nitrogen atom in the primary or secondary amine groups may each be attached to a first carbon atom on the backbone of the polyahl, and in the case of secondary amine groups, be also attached to a second carbon atom. The first and second carbon atoms may independently be primary, secondary, or tertiary carbon atoms that are non-fluorinated, partially fluorinated, or perfluorinated. The composition may comprise at least one fluorinated polyisocyanate having primary, secondary, or tertiary isocyanate groups, or a combination thereof. The fluorinated polyisocyanate may be free of urethane and/or urea linkages, or have at least one (e.g., two, three, four, or more) urethane and/or urea linkages.

The fluorinated polyahl and/or the fluorinated polyisocyanate may comprise at least one (e.g., two, three, four, or more) monovalent, divalent, and/or higher polyvalent fluorine-containing radicals disclosed herein, such as fluorinated radical chosen from (per)fluoroalkyl, (per)fluoroalkylene, (per)fluoroheteroalkyl, (per)fluoroheteroalkylene, (per)fluorocycloalkyl, (per)fluorocycloalkylene, (per)fluoroaryl, (per)fluoroarylalkyl, (per)fluorarylalkylene, (per)fluorocycloheteroalkyl, and (per)fluorocycloheteroalkylene radicals.

DEFINITIONS

As used herein, the terms "araliphatic," "aryl aliphatic," or "aromatic aliphatic" all refer to compounds that contain one or more aromatic moieties and one or more aliphatic moieties, where the reactable functional groups such as, without limitation, isocyanate groups, amine groups, and hydroxyl groups are directly linked to the aliphatic moieties and not directly bonded to the aromatic moieties. Illustrative examples of araliphatic compounds are o-, m-, and p-tetramethylxylene diisocyanate (TMXDI).

The subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

Any numeric references to amounts, unless otherwise specified, are "by weight." The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer.

As used herein, the term "polymer" is used to refer to oligomers, adducts, homopolymers, random copolymers, pseudo-copolymers, statistical copolymers, alternating copolymers, periodic copolymer, bipolymers, terpolymers, quaterpolymers, other forms of copolymers, substituted derivatives thereof, and combinations of two or more thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "telechelic" is used to refer to polymers having at least two terminal reactive end-groups and capable of entering into further polymerization through these reactive end-groups. Reactive end-groups disclosed herein include, without limitation, amine groups, hydroxyl groups, isocyanate groups, carboxylic acid groups, thiol groups, and combinations thereof.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

For molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from 5% to 100% of complete crosslinking. In other examples, the crosslink density can range from 35% to 85% of full crosslinking. In other examples, the crosslink density can range from 50% to 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, or less than 5.

As used herein, the term "percent NCO" or "% NCO" refers to the percent by weight of free, reactive, and unreacted or blocked (e.g., with phenols or ketoxime)isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pa or psi, is derived in accordance to ASTM D6272-02.

As used herein, the term "water vapor transmission rate" ("WVTR") refers to the mass of water vapor that diffuses into a material of a given thickness (e.g., 1 mm) per unit area (e.g., 1 $m^2$) per unit time (e.g., 24 h) at a specific temperature (e.g., 38° C.) and humidity differential (e.g., 90% relative humidity). Standard test methods for WVTR include ASTM E96-00, method E, ASTM D1653-03, and ASTM F1249-01.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

DESCRIPTION OF INVENTION

The partially or fully fluorinated compositions of the present disclosure, preferably being elastic, may offer a variety of advantages over conventional materials used in golf balls. The fluorinated compositions may have decreased flammability, lowered glass transmission temperature, and increased thermal stability, which allows the material to be processed, used, stored, or transported at extreme temperatures without structural failure or degradation. The fluorinated compositions may have decreased surface energy, which allows the molded product to be easily released from the mold. The fluorinated compositions may have decreased refractive indices and be clear. The fluorinated compositions may have decreased coefficient of friction and, thus, improves lubricity. The fluorinated compositions may have increased hydrophobicity, which improves water repellency and moisture barrier properties of the product. The fluorinated compositions may have increased oleophobicity, which improves oil repellency of the material, making the product dirt and stain resistant. The fluorinated compositions may have increased environmental stability when exposed to, for example, UV light and moisture, making the product suitable for outdoor use. The fluorinated compositions may have increased abrasion resistance and tear strength, making the product durable to various physical impacts. The fluorinated compositions are reactive liquid materials, unlike solids (e.g., Teflon, which is difficult to process), have high adhesion, and are able to form a continuous layer that is free of voids over flexible substrates. The fluorinated compositions may reduce losses in coefficient of restitution and compression in the golf balls over time.

The material compositions described herein, while applicable in any portion of the golf ball, can be used in core layer, cover layer, and/or intermediate layer therebetween, such as outer core layer, single-layer cover, inner cover layer, intermediate cover layer, and/or outer cover layer. Desirable properties for cover layer include good moldability, high abrasion resistance, high tear strength, and high resilience. The cover may have a single-layer construction, or a multi-layer construction that includes one or more inner cover layers and an outer cover layer. The outer cover layer may be coated with one or more coating layers, the composition of which may be one or more of the fluorinated reactive liquid compositions disclosed herein. To form a coating layer, the fluorinated composition may incorporate a small amount of solvent, such as 20% by weight or less, or 10% or less, or as low as 2% or 3%. Choices of suitable solvent and blend of solvents are known to one skilled in the art.

The cover layer of the present disclosure may comprise 5 wt. % or more, or 10 wt. % or more, or 75 wt. % or more, or 95 wt. % or more, and up to 100 wt. %, or 95 wt. % or less, or 75 wt. % or less, of a cast, thermoplastic, thermoset, or millable material formed from two or more polyfunctional compounds and applied, for example, in a liquid reactive form. At least one of these reactants can be partially or fully fluorinated (i.e., comprise at least one fluorinated radical). A first polyfunctional compound may comprise a polyisocyanate and/or a polyisocyanate telechelic, and a second polyfunctional compound may comprise a polyahl and/or a polyahl telechelic.

Suitable polyfunctional compounds include, without limitation, polyamine telechelics (e.g., polyamines, polyol telechelics, polyols, aminoalcohol telechelics, aminoalcohols, polyisocyanate telechelics, and polyisocyanates, such as those described in the parent U.S. patent application Ser. Nos. 10/859,557, 10/434,738, and 10/640,532, the disclosures of which are incorporated by reference in their entirety. The functionalities in the polyfunctional compounds may be the same or different and include, without limitation, primary hydroxyl, secondary hydroxyl, tertiary hydroxyl, primary amine, secondary amine, primary isocyanate, secondary isocyanate, and tertiary isocyanate.

Polyamine telechelics have two, three, four, or more amine end-groups capable of forming urea linkages (such as with isocyanate groups), amide linkages (such as with carboxyl group), imide linkages, and/or other linkages with other organic moieties. As such, polyamine telechelics can be reacted with polyacids to form amide-containing polyamine or polyacid telechelics, be reacted with isocyanates to form polyurea prepolymers, and be used as curatives to cure various prepolymers. Any one or more of the hydrogen atoms in the polyamine telechelic (other than those in the terminal amine end-groups) may be substituted with halogens, cationic groups, anionic groups, silicon-based moieties, ester moieties, ether moieties, amide moieties, urethane moieties, urea moieties, ethylenically unsaturated moieties, acetylenically unsaturated moieties, aromatic moieties, heterocyclic moieties, hydroxy groups, amine groups, cyano groups, nitro groups, and/or any other organic moieties. For example, the polyamine telechelics may be halogenated, such as having fluorinated backbones and/or N-alkylated fluorinated side chains. The polyamine telechelic can comprise one or more hydrophobic and/or hydrophilic segments.

Exemplary polyamine telechelics, such as α,ω-amino telechelics, include polyamine polyhydrocarbons (e.g., polyamine polyolefins), polyamine polyethers, polyamine polyesters (e.g., polyamine polycaprolactones), polyamine polyamides (e.g., polyamine polycaprolactams), polyamine polycarbonates, polyamine polyacrylates (e.g., polyamine polyalkylacrylates), polyamine polysiloxanes, polyamine polyimines, polyamine polyimides, and polyamine copolymers including polyamine polyolefinsiloxanes (such as α,ω-diamino poly(butadiene-dimethylsiloxane) and α,ω-diamino poly(isobutylene-dimethylsiloxane)), polyamine polyetherolefins (such as α,ω-diamino poly(butadiene-oxyethylene)), polyamine polyetheresters, polyamine polyethercarbonates, polyamine polyetheramides, polyamine polyetheracrylates, polyamine polyethersiloxanes, polyamine polyesterolefins (such as α,ω-diamino poly(butadiene-caprolactone) and α,ω-diamino poly(isobutylene-caprolactone)), polyamine polyesteramides, polyamine polyestercarbonates, polyamine polyesteracrylates, polyamine polyestersiloxanes, polyamine polyamideolefins, polyamine polyamidecarbonates, polyamine polyamideacrylates, polyamine polyamidesiloxanes, polyamine polyamideimides, polyamine polycarbonateolefins, polyamine polycarbonateacrylates, polyamine polycarbonatesiloxanes, polyamine polyacrylateolefins (such as α,ω-diamino poly(butadiene-methyl methacrylate), α,ω-diamino poly(isobutylene-t-butyl methacrylate), and α,ω-diamino poly(methyl methacrylate-butadiene-methyl methacrylate)), polyamine polyacrylatesiloxanes, polyamine polyetheresteramides, fatty polyamine telechelics, polyamine telechelics derived from acid-catalyzed polyol telechelics, derivatized polyamine telechelics, ethylenically and/or acetylenically unsaturated polyamine telechelics, any other polyamine copolymers, as well as blends thereof.

Polyamines suitable for use in the present disclosure include any and all organic compounds having two, three, four, or more amine groups in the molecule that are capable of forming urea linkages (such as with isocyanate groups) or amide linkages (such as with carboxyl group). The polyamine can be aromatic, araliphatic, aliphatic, alicyclic, heterocyclic, saturated or unsaturated, and each molecule has at least two isocyanate-reactive amine groups independently being primary or secondary. Depending on the number of isocyanate-reactive amine groups being present, polyamines may be referred to as diamines, triamines, tetramines, and other higher polyamines. Polyamines further include, without limitation, fatty polyamines, alkylene polyamines, condensate polyamines, sterically hindered polyamines, and other polyamines. When used as curative, suitable polyamine may have a molecular weight of 40 to 500.

Any polyol telechelics available or known to one of ordinary skill in the art are suitable for use in compositions of the disclosure. Polyol telechelic such as α,ω-dihydroxy telechelics, include polyol polyhydrocarbons (such as polyol polyolefins), polyol polyethers, polyol polyesters (such as polyol polycaprolactones), polyol polyamides (such as polyol polycaprolactams), polyol polycarbonates, polyol polyacrylates (such as polyol polyalkylacrylates), polyol polysiloxanes, polyol polyimines, polyol polyimides, and polyol copolymers including polyol polyolefinsiloxanes (such as α,ω-dihydroxy poly(butadiene-dimethylsiloxane) and α,ω-dihydroxy poly(isobutylene-dimethylsiloxane)), polyol polyetherolefins (such as α,ω-dihydroxy poly(butadiene-oxyethylene)), polyol polyetheresters, polyol polyethercarbonates, polyol polyetheramides, polyol polyetheracrylates, polyol polyethersiloxanes, polyol polyesterolefins (such as α,ω-dihydroxy poly(butadiene-caprolactone) and α,ω-dihydroxy poly(isobutylene-caprolactone)), polyol polyesteramides, polyol polyestercarbonates, polyol polyesteracrylates, polyol polyestersiloxanes, polyol polyamideolefins, polyol polyamidecarbonates, polyol polyamideacrylates, polyol polyamidesiloxanes, polyol polyamideimides, polyol polycarbonateolefins, polyol polycarbonateacrylates, polyol polycarbonatesiloxanes, polyol polyacrylateolefins (such as α,ω-dihydroxy poly(butadiene-methyl methacrylate), α,ω-dihydroxy poly(isobutylene-t-butyl methacrylate), and α,ω-dihydroxy poly(methyl methacrylate-butadiene-methyl methacrylate)), polyol polyacrylatesiloxanes, polyol polyetheresteramides, fatty polyol telechelics, acid-catalyzed polyol telechelics, carbonate-transesterified polyol telechelics, derivatized polyol telechelics, ethylenically and/or acetylenically unsaturated polyol telechelics, any other polyol copolymers, as well as blends thereof. Other polyol telechelics can be derived from polyacid telechelics through reaction with polyols, aminoalcohols, and/or cyclic ethers, or derived from polyamine telechelics through reaction with hydroxy acids, cyclic esters, and/or cyclic ethers as disclosed herein. The polyol telechelics can have one or more hydrophobic and/or hydrophilic segments.

Polyols suitable for use in the present disclosure include any and all organic compounds having two, three, four, or more hydroxyl groups in the molecule that are capable of forming urethane linkages (such as with isocyanate groups) or ester linkages (such as with carboxyl group). The polyol can be aromatic, araliphatic, aliphatic, alicyclic, heterocyclic, saturated or unsaturated, and each molecule has at least two isocyanate-reactive hydroxyl groups independently being primary, secondary, or tertiary. Polyols include, but are not limited to, unsaturated diols, saturated diols, unsaturated triols, saturated triols, unsaturated tetraols, saturated tetraols, alkanediols, fatty diols, fatty triols, and other polyols. When used as curative, suitable polyols may have a molecular weight of 40 to 500.

Aminoalcohol telechelics refer to telechelic polymers having at least one terminal amine end-group and at least one terminal hydroxyl end-group. Any such aminoalcohol telechelics available to one of ordinary skill in the art are suitable for use in compositions of the present disclosure. These telechelics can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric, and include homopolymers, random copolymers, pseudo-copolymers, statistical copolymers, alternating copolymers, periodic copolymer, bipolymers, terpolymers, quaterpolymers, as well as derivatives of any and all polyamine telechelics, polyol telechelics, and polyacids disclosed herein. Aminoalcohol telechelics can have any of the polymer or copolymer structures of the herein-described polyamine telechelics and polyol telechelics, such as polyhydrocarbons (such as polydienes), polyethers, polyesters (such as polycaprolactones), polyamides (such as polycaprolactams), polycarbonates, polyacrylates (such as polyalkylacrylates), polysiloxanes, and copolymers thereof.

Aminoalcohols useful in the present disclosure include any and all monomers, oligomers, and polymers having at least one free isocyanate-reactive hydroxy group and at least one free isocyanate-reactive amine group. The hydroxy and amine groups may be primary or secondary, terminal or pendant groups on the oligomeric or polymeric backbone, and in the case of secondary or tertiary amine groups, may be embedded within the backbone. Aminoalcohols can be linear or branched, saturated or unsaturated, aliphatic, alicyclic, aromatic, or heterocyclic. Suitable aminoalcohols include, without limitation, alkanolamines, N-(hydroxyhydrocarbyl)amines, hydroxypoly(hydrocarbyloxy)amines, hydroxypoly(hydroxyl-substituted oxyalkylene)amines, alkoxylated alkylenepolyamines, and other aminoalcohols. When used as curative, suitable aminoalcohols may have a molecular weight of 40 to 500.

Any one or blend of two or more isocyanate-functional compounds available to one of ordinary skill in the art may be suitable for use in compositions of the present disclosure. Isocyanate-functional compounds can be organic isocyanates in general, and may have an isocyanate functionality of about 1 (i.e., monoisocyanates), such as about 2 or greater (i.e., polyisocyanates). Polyisocyanates for use according to the disclosure can include monomers, dimers (such as uretdiones of identical polyisocyanates and isocyanate derivatives of dimer acids or dimer amines), trimers (such as isocyanurates of identical or different polyisocyanates, isocyanate derivatives of trimer acids or trimer amines), tetramers, oligomers (of same or different monomers, or isocyanate derivatives of oligomer polyacids or oligomer polyamines), adducts (such as uretdiones of different polyisocyanates and isocyanate derivatives of adduct polyacids or adduct polyamines), polymers (such as isocyanate derivatives of polymer polyacids or polymer polyamines), polyisocyanate-terminated prepolymers, low-free-isocyanate prepolymers, quasi-prepolymers, isomers thereof, modified derivatives thereof, and combinations thereof. Structure of the isocyanate reactant can partially or fully be substituted, unsubstituted, saturated, unsaturated, hydrogenated, aliphatic, alicyclic, cyclic, polycyclic, aromatic, araliphatic, heteroaliphatic, and/or heterocyclic.

Suitable polyisocyanates may have the generic structure of $R(NCO)_n$, where n is about 2-4; R comprises one or more linear or branched, substituted or unsubstituted, saturated or unsaturated moieties having about 2-60 carbon atoms, such as aliphatic moieties of about 4-30 or about 6-20 carbon atoms, cyclic or alicyclic moieties of about 6-40 or about 6-30 carbon atoms, aromatic or araliphatic moieties of about 6-30 or about 6-18 carbon atoms, and combinations of two or more thereof. When multiple cyclic or aromatic moieties are present, linear and/or branched aliphatic hydrocarbon moieties having about 1-20 or about 1-10 carbon atoms can be present as spacers separating adjacent ring structures. The cyclic or aromatic moieties may be substituted at 2-, 3-, 4-and/or other available positions. Any available hydrogen atoms in the polyisocyanate can also be substituted. Substituent moieties include, but are not limited to, linear or branched aliphatic hydrocarbons; halogens; organic moieties having one or more heteroatoms such as N, O, S, P, and/or Si (e.g., cyano, amine, silyl, hydroxyl, acid, ether, ester, etc.); or a combination (such as isomeric or racemic mixtures) of two or more thereof. Also included are, for example, oligoisocyanates and polyisocyanates which can be prepared from the diisocyanates or triisocyanates described herein or combinations of two or more thereof by coupling by means of urethane, allophanate, urea, biuret, uretdione, amide, isocyanurate, carbodiimide, uretonimine, oxadiazinetrione, and/or iminooxadiazinedione structures. Suitable polyisocyanates further include those having one or more sterically hindered NCO groups, such as regioselective polyisocyanates, and fatty polyisocyanates derived from fatty polyacids, such as dimer diisocyanates.

Any of the polyfunctional compounds may be non-fluorinated or, preferably, partially or fully fluorinated. That is, these polyfunctional compounds may have one or more, or all carbon-bonded hydrogen atoms replaced or substituted with fluorine atoms. The fluorinated carbon atoms may be partially fluorinated (i.e., having one or more unsubstituted hydrogen atoms), e.g., —CHF—, —CH$_2$F, and —CHF$_2$, or perfluorinated (i.e., having essentially no unsubstituted hydrogen atoms), e.g., —CF—, —CF$_2$—, and —CF$_3$. These partially fluorinated or perfluorinated carbon atoms, alone or in combination thereof, may reside within the backbone of the telechelics, in a radical pedant to the backbone, or in a branched chain off the backbone.

The fluorinated polyfunctional compounds may comprise at least one fluorine-containing radical that is aliphatic, heteroaliphatic, alicyclic, heteroalicyclic, aromatic, heteroaromatic, oligomeric, polymeric, or combination thereof. The fluorine-containing radical include, but are not limited to, fluoroalkyl radicals (saturated or unsaturated monovalent $C_{1-50}$ hydrocarbon radicals, including $C_{1-12}$ linear alkyl, $C_{3-12}$ branched alkyl, $C_{3-12}$ cycloalkyl, and combinations thereof, substituted with one or more fluorine atoms, up to and including perfluoroalkyl radicals, e.g., perfluoropropyl, perfluorobutyl, perfluorooctyl, 3,3,3-trifluoropropyl, γ-(perfluoroethyl)ethyl, fluorocycloalkyls, and the like), fluoroalkylene radicals (saturated or unsaturated divalent $C_{1-50}$ hydrocarbon radicals, including $C_{1-12}$ linear alkylene, $C_{3-12}$ branched alkylene, $C_{3-12}$ cycloalkylene, and combinations thereof, substituted with one or more fluorine atoms, up to and including perfluoroalkylene radicals, e.g., perfluoropropylene, perfluorobutylene, perfluorooctylene, and the like), fluoroaryl and fluoroarylene radicals (aromatic $C_{6-10}$ carbocyclic radicals, substituted with one or more fluorine atoms, up to and including perfluoroaryl and perfluoroarylene radicals), fluoroaralkyl and fluoroaralkylene radicals (monovalent or divalent aromatic $C_{7-50}$ hydrocarbon radicals, including alkyl-aryl, aryl-alkyl, alkyl-arylene, aryl-alkylene, and alkylene-arylene radicals, substituted with one or more fluorine atoms, up to and including perfluoroaralkyl and perfluoroaralkylene radicals, e.g., α,α,α-trifluorotolyl, perfluorobenzyl, perfluoropyridylmethyl, perfluoronaphthylethyl, and the like), fluoroheteroalkyl radicals (monovalent $C_{3-100}$ radicals having at least one fluoroalkylene radical attached to one fluoroalkyl radical by at least one heteroatom or group of heteroatoms chosen from, for example, oxygen, sulfur, nitrogen, silicon, and phosphorous, e.g., perfluoroheteroalkyl radicals like $CF_3CF_2OCF_2CF_2$—, $CF_3CF_2O(CF_2CF_2O)_3CF_2CF_2$—, or $C_3F_7O(CF(CF_3)CF_2O)_mCF(CF_3)CF_2$— where m is 5-30 or 10-30), and fluoroheteroalkylene radicals (divalent $C_{3-100}$ radicals having two or more perfluoroalkylene radicals attached together by one or more heteroatoms or groups thereof, e.g., —$CF_2O(CF_2O)_n(CF_2CF_2O)_mCF_2$— and —$CF_2OCF_2$— where n and m are the same or different integers of 5-30, and the like). Certain fluorocarbon and perfluorocarbon radicals may have 6 or fewer carbon atoms in any one linear chain, such as perfluoroalkyl and perfluoroalkylene radicals having 3-5 carbon atoms. Perfluoroheteroalkyl and perfluoroheteroalkylene radicals may have 3-50 carbon atoms. Perfluoroheteroalkyl and perfluoroheteroalkylene radicals can be perfluoropolyether radicals free of perfluorocarbon chains having more than 6 carbon atoms.

The fluorinated polyfunctional compound may be clear liquids, having a molecular weight of 40 or more, or 500 or more, or 1,000 or more, or 1,500 or more, or 2,000 or more, or 2,500 or more, or 3,000 or more, or 4,000 or more, or 5,000 or more, or 7,000 or more, or 10,000 or more, and up to 50,000, or 15,000 or less, or 10,000 or less, or 7,000 or less, or 6,000 or less, or 5,000 or less, or 4,000 or less, or 3,000 or less, or 2,500 or less, or 2,000 or less, or 1,000 or less, or 500 or less. The fluorinated polyfunctional compound may have a kinematic viscosity at 20° C. of 70 or more, or 75 or more, or 85 or more, or 90 or more, or 100 or more, and preferably 2,000 or less, or 150 or less, or 100 or less, or 85 or less, or 75 or less, or 70 or less. The polyfunctional compound may have a polydispersity of 1.05 or more, or 1.1 or more, or 1.3 or more, or 1.5 or more, or 2 or more, or 2.5 or more, and preferably 3 or less, or 2.5 or less, or 1.5 or less, or 1.35 or less, or 1.1 or less, or 1.05 or less. The polyfunctional compound may have a glass transition temperature of −100° C. or more, or −90° C. or more, or −80° C. or more, or −70° C. or more, or −50° C. or more, and prefereably −40° C. or less, or −50° C. or less, or −70° C. or less, or −80° C. or less, or −90° C. or less, or −100° C. or less. Compositions formed at least in part from one or more of these fluorinated polyfunctional compounds may have a glass transition temperature of as low as −120° C., or −50° C. or more, or −40° C. or more, preferably −20° C. or less, or −40° C. or less, or −50° C. or less, and a low surface energy of 10 mN/m or more, or 15 mN/m or more, preferably 35 mN/m or less, or 25 mN/m or less, or 18 mN/m or less, or 15 mN/m or less, or 10 mN/m or less. The fluorinated polyfunctional compound may have a fluorine content of 5% or more, or 10% or more, or 20% or more, or 30% or more, or 40% or more, or 50% or more, preferably 85% or less, or 75% or less, or 70% or less, or 60% or less, or 50% or less.

Fluorinated polyfunctional compounds useful in the present invention may comprise one, two, three, four, or more fluorine-containing radicals chosen from one or more of the groups below:

(a) $CF_3(CF_2)_{m-1}$—, —$(CF_2)_m$—, —$CF(CF_3)$—$(CF_2)_{m-1}$—$CF(CF_3)$—, $CF_3CF_2O(C_2F_4O)_{m-1}CF_2CF_2$—, $C_3F_7O(CF(CF_3)CF_2O)_{m-1}CF(CF_3)CF_2$—, —$CF_2O(CF_2O)_{m-1}$ $(C_2F_4O)_{m-1}CF_2$—, —$C_2F_4O(CF_2)_mOC_2F_4$—, and —$CF_2OC_2F_4O(CF_2)_mOC_2F_4OCF_2$—, where —$C_2F_4$— is —$CF_2CF_2$—, —$CF(CF_3)$—, or a combination thereof; and m is the same or different integers of 1, 2, 3, 4, 5, 6, 7, 8, 9, 10, and up to 200, or 31 or less, or 20 or less, or 18 or less;

(b) $R_f''SO_2N$=, $R_f''OC_6H_4SO_2N$=, $R_f''CH_2CON$=, $R_f''CON$=, $R_f''CH_2CH_2SCH$=, and $R_f''CH_2CH$=, where $R_f''$ is a perfluorinated monovalent radical;

(c)
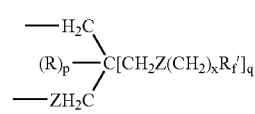

where $R_f'$ is the same or different monovalent linear or branched radicals of $C_{1-20}$ perfluoroalkyls, $C_{1-20}$ ω-hydroperfluoroalkyls, or $C_{4-60}$ oxaperfluorinated polyethers; Z is the same or different radicals of —O—, —S—, —NR—, —SO$_2$—, or —N(R)SO$_2$—; R is the same or different radicals of H or linear or branched $C_{1-6}$ alkyls; p is 1 when q is 1, or 0 when q is 2; and x is the same or different integers of 1 to 10;

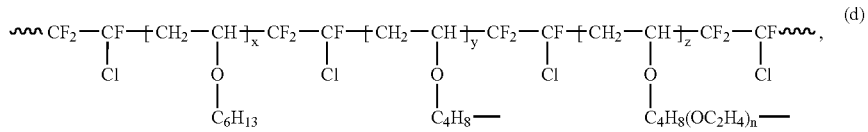

where x, y, and z are the same or different numbers of 1 to 200, and n is 1 to 20;

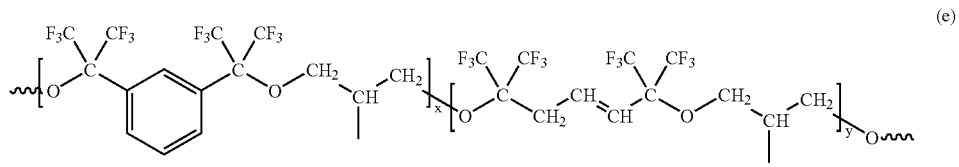

where x and y are the same or different numbers of 1 to 50;

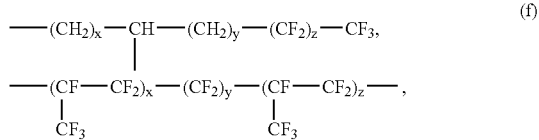

and —$(CH_2)_x$—$(CF_2)_y$—$(CH_2)_z$—, where x, y, and z are chosen such that the fluorinated polyol has a weight average molecular weight of 100 to 3,000;

(g) —$[(CFX)_r(CH_2)_sO]_t$— where X is the same or different radicals of —F or —$CF_3$, r is the same or different numbers of 1, 2, or 3, s is the same or different numbers of 0, 1, or 2, and t is 1 to 100;

(h) —$CF_2O[(CF_2)_2O]_x[(CF_2)_3O]_yCF_2CF_2O[(CF_2)_3O]_y[(CF_2)_2O]_xCF_2$—, —$CF_2O[(CF_2)_2O]_xCF_2$—, —$CF_2O[(CF_2)_2O]_x[(CF_2)_4O]_y[(CF_2)_2O]_xCF_2$—, —$CF_2)_2O[(CF_2)_3O]_x(CF_2)_2$—, and —$CF_2)_3O[(CF_2)_4O]_xC_3F_6$—, where x and y are the same or different integers of 1 or greater;

(i) —$CF_2O—[(CF_2)_mO]_n—[(CF_2)_xO]_y—CF_2$—, —$CF_2O[CF_2CF(CF_3)O]_nCF_2$—, and —$CF_2O(CF_2CF_2O)_nCF_2$—, where m, n, x, and y are chosen so that the fluorinated polyfunctional compound has a weight average molecular weight of 400 to 5,000, and n/y is at least 0.9;

(j)

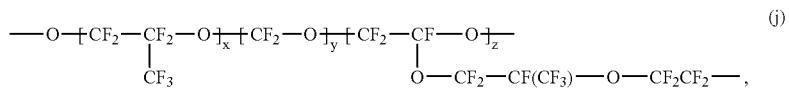

where x, y, and z are the same or different numbers of 1 to 200;

(k) —$CF_2CH_2(OCF_2CF_2CH_2)_pORO(CH_2CF_2CF_2O)_qCH_2CF_2$—, —$CF_2O(C_2F_4O)_r(CF_2O)_sCF_2$—, —$[CF(CF_3)OCF_2]_pR[CF_2OCF(CF_3)]_q$—, and —$CF_2O[CF_2CF(CF_3)O]_t(C_2F_4O)_u(CFXO)_vCF_2$— where R is a $C_{1-10}$ fluoroalkylene divalent radical, p/q is 0.8 to 1.2, X is the same or different radicals of —F or —$CF_3$, r/s is 0.2 to 5, t/u is 0.6 to 2, and u/v is 10 or greater;

(l) —$CF_2O(C_2F_4CH_2O)_xR_fO(CH_2C_2F_4O)_yCF_2$—, —$CF_2O[CF_2CF(CF_3)O]_x(CFXO)_yCF_2$—, —$CF_2O[CF_2CF(CF_3)O]_xR_fO[CF(CF_3)CF_2O]_yCF_2$—, —$CF_2O(C_2F_4O)_xCF_2$—, —$CF_2O(C_3F_6O)_xCF_2$—, —$CF_2O(C_2F_4O)_w(CF_2O)_x[CF(CF_3)CF_2O]_y[CF(CF_3)O]_zCF_2$—, —$CF_2O[CF_2CF(CF_3)O]_xCF_2$—, —$CF_2O(C_2F_4CH_2O)_xCF_2$—, and —$CF_2(OC_2F_4)_x(OCF_2)_y$— where $R_f$ is a perfluoroalkylene divalent radical, X is the same or different radicals of —F or —$CF_3$, and w, x, y, and z are the same or different integers of 1 or greater;

(m) —$(CH_2OCH_2)_x(CF_2OCF_2)_y(OCF_2)_z(CH_2OCH_2)_x$—, —$CF_2O(C_3F_6O)_p(C_2F_4O)_q(CFXO)_rCF_2$—, —$CF_2(CH_2OC_2F_4)_mCH_2OR_fOCH_2(C_2F_4OCH_2)_nCF_2$—, and —$[CF(CF_3)OCF_2]_b—(R_f)_a—[CF_2OCF(CF_3)]_d$— where $R_f$ is a divalent fluoroaliphatic radical, X the same or different radicals of —F or —$CF_3$, a is 0 or 1, b and d are the same or different numbers of 2 to 100, m and n are the same or different numbers of 1 to 100, p, q, and r are the same or different numbers of 0 to 100, p+q>0, x is 0 to 3, and y/z is 0.2 to 2;

(n) —$(CH_2)_m(CF_2)_n(CH_2)_m$—, where m is 1 or 2, and n is 1 to 20;

(o) —$(CF_2)_pO(C_qF_{2q})O(CF_2)_p$— and —$CF_2)_pO(CF_2)_m(C_qF_{2q-2})(CF_2)_mO(CF_2)_p$— where $C_qF_{2q-2}$ comprises at least one perfluorocloalkylene divalent radical, m is 0 or 1, p is 1 to 6, and q is 5 to 12;

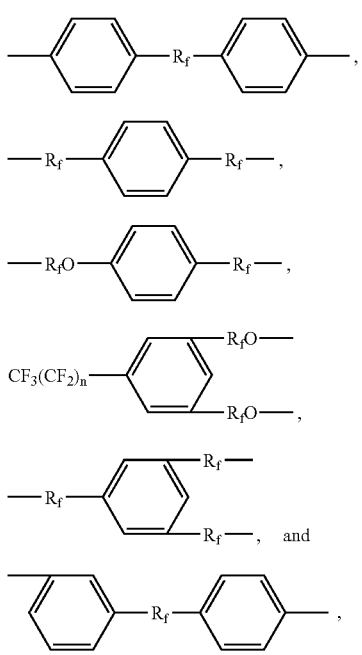

where $R_f$ is the same or different divalent perfluoroalkylenes, such as —C(CF$_3$)$_2$—; and (q) —[CF$_2$]$_p$O—[C$_m$F$_{2m}$O]$_n$—[CF$_2$]$_q$—, —[CF$_2$]$_p$O—[C$_m$F$_{2m}$O]$_n$—[C$_x$F$_{2x}$O]$_y$—[C$_m$F$_{2m}$O]$_n$—[CF$_2$]$_q$—, —[CF$_2$]$_p$O—[C$_m$F$_{2m}$O]$_n$—[C$_x$F$_{2x}$O]$_y$—[C$_z$F$_{2z}$O]$_v$—[C$_x$F$_{2x}$O]$_y$—[C$_m$F$_{2m}$O]$_n$—[CF$_2$]$_q$—, —[CF$_2$]$_p$O—[C$_x$F$_{2x}$O]$_y$—[C$_z$F$_{2z}$O]$_v$—[CF$_2$]$_q$—, —[CF$_2$]$_p$O—[C$_m$F$_{2m}$O]$_n$—[C$_x$F$_{2x}$O]$_y$—[C$_z$F$_{2z}$O]$_v$—[C$_s$F$_{2s}$O]$_t$—[CF$_2$]$_q$—, —[CF$_2$]$_p$O—[C$_m$F$_{2m}$CH$_2$O]$_n$—[CF$_2$]$_q$—, —[CF$_2$]$_p$O—[C$_m$F$_{2m}$O]$_n$—R$_f$O—[C$_x$F$_{2x}$O]$_y$—[CF$_2$]$_q$—, —[CF$_2$]$_p$O—[C$_m$F$_{2m}$CH$_2$O]$_n$—R$_f$O—[CH$_2$C$_x$F$_{2x}$O]$_y$—[CF$_2$]$_q$—, —[CF$_2$]$_p$O—[C$_m$F$_{2m}$O]$_n$—RO—[C$_x$F$_{2x}$O]$_y$—[CF$_2$]$_q$—, —[CF$_2$]$_2$O—[C$_m$F$_{2m}$CH$_2$O]$_n$—RO—[CH$_2$C$_x$F$_{2x}$O]$_y$—CH$_2$[CF$_2$]$_q$—, and —[C$_m$F$_{2m}$—C$_u$H$_{2u}$—O]$_n$— where m, s, x, and z are independent integers of 1, 2, 3, 4, 5, 6, or greater, preferably up to 20 or 12; n, s, and y are independent integers of 1 to 100, preferably 30 or less; n/y may be 0.2-5, 0.6-2, 0.8-1.2, or 0.9 or greater, p and q are independent integers of 1, 2, 3, or greater; v is integer of 1 or greater, preferably 10 or less; y/v is 10 or greater; u is 1 or 2; preferably, the radicals —C$_m$F$_{2m}$—, —C$_s$F$_{2s}$—, —C$_x$F$_{2x}$—, and/or —C$_z$F$_{2z}$— are independently chosen from —CF$_2$CF(CF$_3$)—, —CF$_2$CF$_2$—, —CF$_2$—, —CF(CF$_3$)—, —CF$_2$CF$_2$CF$_2$—, and —CF$_2$CF$_2$CF$_2$CF$_2$—;

(r) combinations of two or more radicals listed in (a) through (q).

The fluorinated polyfunctional compound may further comprises one, two, three, four, or more monovalent, divalent, or polyvalent, linear or branched, and saturated or unsaturated radicals other than those listed above, such as, without limitation, C$_{1-20}$ aliphatic radicals (e.g., linear or branched C$_{1-12}$, C$_{1-6}$, or C$_{1-4}$ alkyls and C$_{1-12}$ alkylenes), C$_{6-20}$ aromatic radicals, C$_{6-20}$ alicyclic radicals, C$_{2-12}$ alkylenethio-alkylenes, C$_{2-12}$ alkylene-oxyalkylenes, C$_{2-12}$ alkylene-iminoalkylenes in which the N is optionally attached to a C$_{1-6}$ alkyl

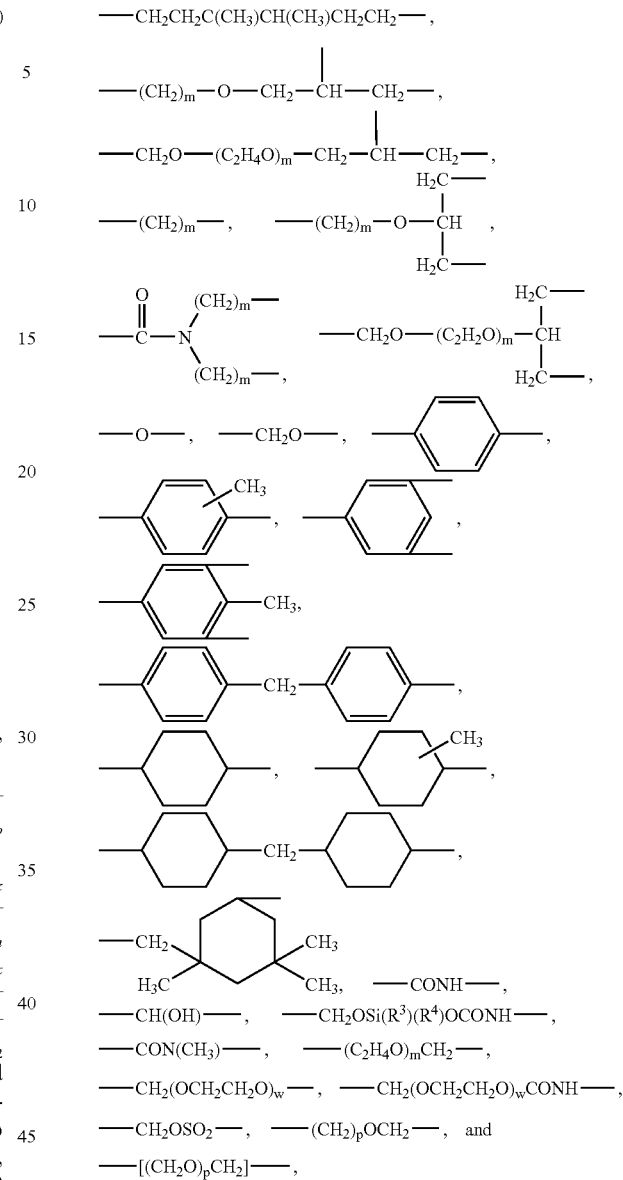

where $R^3$ and $R^4$ are the same or different linear or branched C$_{1-4}$ alkyls; m is 1, 2, 3, 4, 5, or greater; p is 1, 2, 3, 4, or greater; and w is 1 to 10.

The fluorinated polyfunctional compound may have one of the non-limiting structures: Y$_1$-(Q$_f^1$)$_a$-Y$_2$, Y$_1$-(Q$_f^2$)$_a$-(Q$_f^2$)$_b$-Y$_1$, Y$_1$-(Q$_f^1$)$_a$-(Q$_H^1$)$_b$-(Q$_f^2$)$_d$-Y$_2$, Y$_1$-(Q$_H^1$)$_b$-(Q$_f^1$)$_a$-(Q$_f^2$)$_g$-(Q$_H^2$)$_d$-Y$_2$, Y$_1$-(Q$_f^1$)$_a$-(Q$_H^1$)$_b$-Y$_2$, Y$_1$-(Q$_H^1$)$_b$-(Q$_f^1$)$_a$-(Q$_H^2$)$_d$-Y$_2$, and Y$_1$-(Q$_H^3$)$_x$-(Q$_H^1$)$_b$-(Q$_f^1$)$_a$-(Q$_f^2$)$_d$-(Q$_H^4$)$_y$-Y$_2$, where Q$_f^1$ and Q$_f^2$ are the same or different, linear or branched, fluorinated, divalent or higher polyvalent, radicals each comprising one fluorinated radical or a combination of two or more fluorinated radicals such as those disclosed herein, like —OCH$_2$CFXOR$_f$CFXCH$_2$O— where R$_f$ is a fluoropolyether chain and X is the same or different radicals of —F or —CF$_3$, preferably having a M$_n$ of 500 to 5,000 or 700 to 1,500; Q$_H^1$ and Q$_H^2$ are the same or different, linear or branched, non-fluorinated, divalent or higher polyvalent, radicals each comprising one non-fluorinated radical or a combination of two or more non-fluorinated radicals such as those disclosed herein, like $C_{1-20}$ alkylenes, $C_{3-20}$ (alkylene) cycloaliphatics, and $C_{5-30}$ (alkylene)aromatics, preferably free of —COOH, —OCONH—, —NHCONH—, —CONH—, —OH, —NH$_2$, and —NH—; $Q_H^3$ and $Q_H^4$ are independent divalent radicals of the structure —(CH$_2$CH$_2$O)$_n$(Q$_H^1$)$_z$— where n is 0, 1, 2, 3, 4, 5, or 6 and z is 0, 1, 2, 3, or up to 10; a, b, d, and g are the same or different integers of 1, 2, 3, 4, 5, or greater, preferably up to 100, or up to 50, or up to 10. The $Q_f$ groups may be linked to the $Q_H$ groups preferably via ether linkages. The distribution of $Q_f^1$, $Q_f^2$, $Q_H^1$, and/or $Q_H^2$ may independently being statistically random, or in blocks. The composition comprising the fluorinated polyfunctional compound may be substantially solventless, and may form upon curing a material that is weather-resistant, transparent, and/or thermoset.

The fluorinated polyfunctional compound may optionally be substituted with or contain other groups, including acidic groups, ionic groups, and polymerizable groups. Acidic and ionic groups include carboxylic acid, carboxylate, sulfate, sulfonic acid, sulfonate, phosphate, phosphonic acid, phosphonate, ammonium, quaternary ammonium, and the like. Polymerizable groups include acrylate, methacrylate, vinyl, allyl, glycidyl, and the like. As used herein below and throughout the present disclosure, Y represents the same or different functional groups each comprising at least one functionality of —OH, —NH$_2$ (primary amine), —NHR (secondary amine), —NCO, epoxy, glycidyl ether, vinyl ether, or unsaturated carboxylates such as acrylate and methacrylate, where R is a $C_{1-20}$ radicals that is linear, branched, or cyclic; saturated, unsaturated, or aromatic, and/or non-fluorinated, partially fluorinated, or perfluorinated. Examples of Y comprising two or more functionalities include, without limitation, linear or branched monovalent radicals comprising one or more linear or branched $C_{1-6}$ alkylenes and/or alkenylenes and 1, 2, 3 or more functional groups as disclosed herein, such as —CH$_2$OH, —CH$_2$NH$_2$, —CH$_2$NCO, —CH(OH)—(CH$_2$)$_n$OH, —CH(CH$_2$OH)$_2$, —CH$_2$CH(OH)—(CH$_2$)$_n$OH, —CH$_2$)$_6$CH(CH$_2$OH)$_2$, —CH(COOH)$_2$, —CH(CH$_2$NH$_2$)$_2$, and —CH(CH$_2$OCH$_2$CH=CH$_2$)$_2$, where n is 1, 2, 3, 4, 5, 6, 7, 8, 9, 10, or greater.

Partially or fully fluorinated polyfunctional compounds may be used alone, in blends of two or more thereof, or in blends with one or more non-fluorinated polyfunctional compounds. Useful weight or molar ratios of non-fluorinated polyfunctional compounds to fluorinated polyfunctional compounds can be 1:0.1 to 1:100, preferably 1:1 to 1:20. Suitable fluorinated or non-fluorinated polyfunctional compounds, particularly polyahl telechelics (e.g., polyol telechelics, polyamine telechelics, aminoalcohol telechelics) may have a molecular weight of 200 or more, or 500 or more, or 1,000 or more, and a functionality of 1.6 or more, or 1.9 or more, preferably 2.5 or less, or 1.9 or less.

Polyols and polyol telechelics, being partially or fully fluorinated, or not, can be converted into polyamines and polyamine telechelics, respectively, by replacing one, two, or more, or all of the hydroxyl groups with primary and/or secondary amine groups (i.e. NH$_2$ and NHR where R is the same or different organic radicals having 1-20 carbon atoms) through, for example, an amination reaction as understood by the skilled in the art. Exemplary amination reactions include reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, or any other methods known to the skilled artisan.

Polyamines and polyamine telechelics, being partially or fully fluorinated, or not, can be converted into polyisocyanates and polyisocyanate telechelics, respectively, by transforming one, two, or more of the amine groups into isocyanate groups (i.e. NCO) through, for example, reaction of phosgene with the polyamine telechelics or salts thereof, although other suitable conversion schemes may also be applicable. For example, the polyamine may react with phosgene to yield the corresponding carbamoyl chloride, which then loses hydrogen chloride to form the polyisocyanate. Alternatively, the polyamine may be converted to its hydrochloride salt, and then reacted with phosgene to form the polyisocyanate.

Non-limiting examples of fluorinated polyfunctional compounds include $R_f'SO_2N(CH_2CH_2Y)_2$ (e.g., N-bis(2-hydroxyethyl)perfluorobutylsulfonamide), $R_f'CH_2CH(Y)CH_2Y$, $R_f'OC_6H_4SO_2N(CH_2CH_2Y)_2$, $R_f'CH_2CON(CH_2CH_2Y)_2$, $R_f'CON(CH_2CH_2Y)_2$, $R_f'CH(Y)CH(CH_3)Y$, $R_f'CH_2CH(Y)CH_2SCH_2CH_2Y$, $R_f'(CH_2)_2SC_3H_6OCH_2CH(Y)CH_2Y$, $R_f'(CH_2)_3OCH_2CH(Y)CH_2Y$, $R_f'(CH_2)_4SC_3H_6OCH_2CH(Y)CH_2Y$, $R_f'(CH_2)_2SCH_2CH(Y)CH_2Y$, $R_f'(CH_2)_3SCH_2CH(Y)CH_2Y$, $R_f'CH_2CH(C_2H_5)SCH_2CH(Y)CH_2Y$, $R_f'CH_2CH(C_4H_9)SCH_2CH(Y)CH_2Y$, $R_f'CH_2CH(CH_3)OCH_2CH(Y)CH_2Y$, $R_f'CH_2OCH_2CH(Y)CH_2Y$, $R_f'(CH_2)_2OC_2H_4OCH_2CH(Y)CH_2Y$, $R_f'CH_2CH(Y)CH_2OCH_2CH_2Y$, $R_f'CH(CH_2CH_2Y)SCH_2CH_2Y$, $R_f'(CH_2)_4SC_3H_6CH(CH_2Y)CH_2Y$, $R_f'(CH_2)_4SCH_2CH(CH_2Y)CH_2Y$, $R_f'CH_2SCH(CH_2Y)CH_2CH_2Y$, $R_f'(CH_2)_2SC_3H_6CH(CH_2Y)CH_2Y$, $R_f'CH(Y)CH_2Y$, $R_f'R'_n[OCH_2CH(Y)CH_2]_xY$, $R_f'R'SCH(R''Y)CH_2R''Y$, and $R_f'R'SCH(R''Y)CH(R''Y)SR'R_f'$ (e.g., $R_f'CH_2CH_2SCH(CH_2Y)CH(CH_2Y)SCH_2CH_2R_f'$), wherein $R_f'$ is the same or different linear or branched fluorine-containing monovalent radicals chosen from $C_{1-20}$, $C_{1-6}$, $C_{4-18}$, or $C_{6-12}$ perfluoroalkyls, $C_{5-25}$ perfluorooxyalkyls, $C_{3-50}$ perfluoroheteroalkyls having only divalent $C_{1-6}$ perfluoroalkylenes, any other fluorine-containing monovalent radicals as disclosed herein, and combinations of two or more thereof, R' is the same or different linear or branched divalent radicals chosen from $C_{1-12}$ alkylenes (e.g., —C$_m$H$_{2m}$—, where m is 1, 2, 3, 4, 5, or 6), $C_{2-12}$ alkylene-thioalkylenes, $C_{2-12}$ alkylene-oxyalkylenes, $C_{2-12}$ alkylene-iminoalkylenes having a third N-substituent of H or linear or branched $C_{1-6}$ alkyls, and combinations of two or more thereof, R" is the same or different linear or branched divalent radicals chosen from alkylene-polyoxyalkylenes of —C$_m$H$_{2m}$(O$C_p$H$_{2p}$)$_q$— where m is 1-12 or 1-4, p is 2-6 or 2-4, and q is 1-40 or 1-4, and $C_{1-12}$ or $C_{1-4}$ alkylenes, and combinations of two or more thereof, and x is 1, 2, 3, or greater. Other examples include YCH$_2$CF$_2$CF$_2$O(CF$_2$)$_4$OCF$_2$CF$_2$CH$_2$Y (e.g., 1,4-bis(1-hydroxy-1,1-dihydroperfluoropropoxy)-perfluoro-n-butane); YCH$_2$CF$_2$OC$_2$F$_4$O(CF$_2$)$_4$OC$_2$F$_4$OCF$_2$CH$_2$Y (e.g., 1,4-bis(1-hydroxy-1,1-dihydroperfluoroethoxyethoxy)-perfluorobutane; branch-fluorinated polyfunctional compounds made by the ring-opening reaction of fluorinated cyclic ethers; polyether polyfunctional compounds prepared by ring opening addition polymerization of a fluorinated organic group substituted epoxide with a compound containing at least two functional groups; and fluoropolyether difunctional compounds like YCH$_2$CF$_2$O(CF$_2$O)$_m$(CF$_2$CF$_2$O)$_n$CF$_2$CH$_2$Y. Y is the same or different functional groups as described herein. Fluorinated polyfunctional compounds comprising at least one fluoropolyether segment can have a molecular weight of 15,000 or less, or 7,000 or less, preferably 400 or more, or 1,000 or more.

Branch-fluorinated polyfunctional compounds may have two terminal functional groups Y on a main chain, and one or more branches (i.e., monovalent pendant groups) covalently bonded to one or more C, N, S, and/or Si atoms on the main chain, wherein at least one of such branches is fluorinated. The main chain may be substantially non-fluorinated (i.e., substantially free of carbon atoms that are covalently bonded to one or two fluorine atoms), or partially fluorinated. The fluorinated branch may have 2, 3, or more carbon atoms. The fluorinated branch may have 1, 2, or more non-fluorinated carbon atoms. Two fluorinated branches, being the same or different, may be covalently bonded to a single C or Si atom on the main chain. Branch-fluorinated polyfunctional compounds include, without limitation, diols, diamines, aminoalcohols, diisocyanates, and higher polyols, polyamines, polyaminoalcohols, and polyisocyanates. Branch-fluorinated polyfunctional compounds may be monomers, oligomers, homopolymers, random or block copolymer, or random or block terpolymers, comprising one, two, or three different, preferably repeating, monomeric units, each having a generic structure of

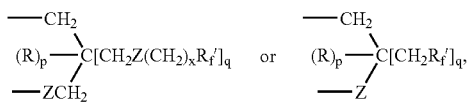

where each $R_f'$ within each unit and/or between different units can be the same or different fluorinated monovalent radicals independently chosen from linear or branched $C_{1-20}$, $C_{1-12}$, especially $C_{4-10}$, like $C_6$, perfluorinated (iso) alkyls (i.e., alkyls or isoalkyls), linear or branched $C_{1-20}$ ω-hydroperfluoroalkyls, $C_{4-60}$ or $C_{4-20}$ oxaperfluorinated polyethers, and other radicals disclosed herein; each Z within each unit and/or between different units can be the same or different divalent radicals independently chosen from —O—, —S—, —NR—, —SO$_2$—, and —N(R)SO$_2$—; each R within each unit and/or between different units can be the same or different monovalent radicals independently chosen from H and linear or branched $C_{1-6}$, $C_{1-4}$, or $C_{2-5}$ alkyls (e.g., methyl, ethyl, propyl, isopropyl, butyl, sec-butyl, tert-butyl, and the like); p is 1 when q is 1, or 0 when q is 2; and x is the same or different integers of 1, 2, 3, 4, 5, 6, 7, 8, 9, 10, or greater. When the branch-fluorinated polyfunctional compound is a telechelic, the amount of monomer units may be 100 or less, or 68 or less, or 50 or less, or 20 or less, preferably at least 5, or at least 8, or at least 10. In each $R_f'$, 75% or more of the non-carbon and non-oxygen atoms may be fluorine atoms, with the remainder being H, Cl, I, and/or Br. Non-limiting examples of $R_f'$ include —CF$_3$, —C$_2$F$_5$, —C$_3$F$_7$, —C$_4$F$_9$, —C$_5$F$_{11}$, —C$_6$F$_{13}$, —C$_7$F$_{15}$, —C$_8$F$_{17}$, —C$_{10}$F$_{21}$, —C$_{12}$F$_{23}$, and combinations of two or more thereof. Branch-fluorinated polyfunctional compound may be homopolymer or copolymer (including terpolymer).

Branch-fluorinated polyfunctional compounds, or any other fluorinated polyfunctional compounds disclosed herein, may further comprise at least one fluorinated or non-fluorinated oxyalkylene unit having a structure of —[OR']$_z$—, where R' is a linear or branched $C_{2-20}$, $C_{3-12}$, or $C_{4-6}$ divalent fluorinated or non-fluorinated alkylene radical, and z is 1 to 150, or 8 to 100, or 10 to 68, or 10 to 50. Non-limiting examples of the non-fluorianted oxyalkylene unit include —[OCH$_2$CH(CH$_3$)CH$_2$CH$_2$]$_z$—, —[OCH$_2$CH$_2$]$_z$—, —[OCH(CH$_3$)CH$_2$CH$_2$]$_z$—, —[OCH$_2$CH(CH$_3$)CH$_2$]$_z$—, —[OCH$_2$CH$_2$CH(CH$_3$)]$_z$—, —[OC(CH$_3$)$_2$CH$_2$]$_z$—, —[OCH$_2$C(CH$_3$)$_2$]$_z$—, —[OCH(CH$_2$CH$_3$)CH$_2$]$_z$—, —[OCH$_2$CH(CH$_2$CH$_3$)]$_z$—, —[OCH(CH$_3$)CH$_2$]$_z$—, —[OCH$_2$CH(CH$_3$)]$_z$—, —[OCH$_2$CH$_2$CH$_2$CH$_2$]$_z$—, —[OCH$_2$CH$_2$CH$_2$CH(CH$_3$)]$_z$—, —[OCH$_2$CH$_2$CH(CH$_3$)CH$_2$]$_z$—, —[OCH(CH$_3$)CH$_2$CH$_2$CH$_2$]$_z$—, —[OCH$_2$CH$_2$CH$_2$CH$_2$]$_z$—, —[OCH$_2$CH$_2$CH$_2$]$_z$—. Two, three, four, or more of these oxyalkylene units may be co-present randomly or in blocks in a branch-fluorinated polyfunctional compound, where any two monomeric units may have a molar ratio of 5:95 to 50:50, or 10:90 to 50:50.

Fluorinated polyfunctional compounds further include poly(fluoroethylene-co-vinyl ether) polyfunctional compounds, such as those comprising the following structure, where x, y, and z are independently (i.e., the same or different numbers) chosen from 1-200, and n is 1-20:

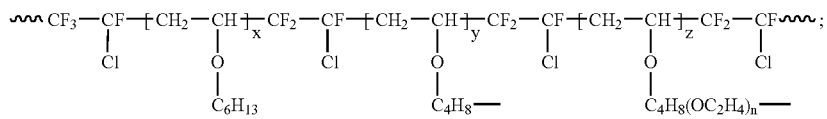

hexafluoroacetone-based polyfunctional compounds, such as those comprising the structure below, where Z is independently chosen from H and Y, x and y are independently chosen from 1-50:

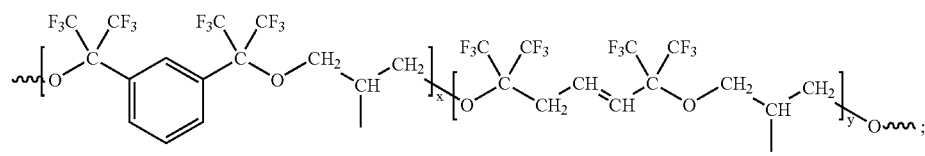

fluoroalkane polyfunctional compounds of the structure Y(CH$_2$)$_x$CH(Y)(CH$_2$)$_y$(CF$_2$)$_z$CF$_3$, Y(CH$_2$)$_x$(CF$_2$)$_y$(CH$_2$)$_z$Y, or YH$_2$CH$_2$C[(CF(CF$_3$)CF$_2$]$_x$(CF$_2$)$_y$[(CF(CF$_3$)CF$_2$]$_z$CH$_2$CH$_2$Y, where x, y, and z are chosen such that the M$_w$ of the fluoroalkane polyfunctional compounds can be 100 or more, or 1,000 or more, or 2,000 or more, or 3,000 or more, preferably 7,000 or less, or 5,000 or less, or 3,000 or less (e.g., x and z are independent integers of 1, 2, 3, 4, or greater, y is integer of 1-20 or 2-16), such as YCH$_2$(CF$_2$)$_4$CH$_2$Y, YCH$_2$(CF$_2$)$_3$CH$_2$Y, YCH$_2$(CF$_2$)$_2$CH$_2$Y, YCH$_2$CH(Y)CH$_2$(CF$_2$)$_5$CF$_3$, YCH$_2$CH$_2$(CF$_2$)$_5$CF(CF$_3$)CH$_2$CH$_2$Y; fluoroether polyfunctional compounds of the structure Y$_x$T$^1$-R$_f$-T$^2$Y$_y$, where x and y are independently 1 or 2, R$_f$ is a divalent, homopolymeric or random or block copolymeric, fluoropolyether radical having an averaged molecular weight of 400 or more, or 1,000 or more, and up to 20,000, or 7,000 or less, and comprising one or a combination of two, three, or more different oxyperfluoroalkylenes of the structure —[(CFX)$_r$(CH$_2$)$_s$O]$_t$—, where X is the same or different radicals chosen from —F and —CF$_3$, r is the same or different numbers chosen from 1, 2, and 3, s is the same or different numbers chosen from 0, 1, and 2, t is chosen from 1-100, e.g., —(CF$_2$O)$_t$—, —[(CF$_2$)$_2$O]$_t$—, —[(CF$_2$)$_3$O]$_t$—, —[CF$_2$CF(CF$_3$)$_s$O]$_t$—, —[CF(CF$_3$)$_s$O]$_t$—, —[(CF$_2$)$_2$CH$_2$O]$_t$—; T$^1$ and T$^2$ are independently (i.e., the same or different radicals) chosen from divalent radicals such as —(CH$_2$)$_m$—, —CH$_2$(OCH$_2$CH$_2$)$_m$—, trivalent radicals optionally having at least one ether and/or amidic bond, e.g.:

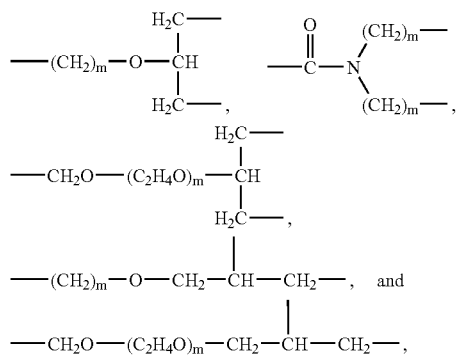

where m is chosen from 1, 2, 3, and 4; fluorosulfonamide polyfunctional compounds; fluorinated vinyl polyfunctional polymers and copolymers thereof; fluoroolefin vinyl ether copolymer telechelics; fluorinated polytetramethylene oxide difunctional telechelics; and the like; and combinations of two or more thereof.

In general, fluorinated difunctional compounds may have a structure of R$_f$''[(R)$_p$—Y]$_q$ where R$_f$'' is a divalent or higher polyvalent radical chosen from monomeric or polymeric, linear or branched, fluorinated alkylene, oxyalkylene, arylene, oxyarylene, and any other fluorine-containing radicals as disclosed herein, and combinations of two or more thereof, such as those disclosed herein; R is the same or different divalent radicals chosen from monomeric or polymeric, linear or branched, alkylene, oxyalkylene, alkylene sulfide, arylene, oxyarylene, arylene sulfide, siloxane, and combinations of two or more thereof, such as those disclosed herein; p is the same or different whole numbers of 0 or 1; and q is 2 or more, or 3 or more, or 5 or more, or 6 or more, or 10 or more, preferably 10 or less, or 6 or less, or 5 or less, or 4 or less. Non-limiting examples include 1H, 1H,9H,9H-perfluoro-1,9-nonanediol, 1H,2H,3H,3H-perfluorononane-1,2-diol, 1H,1H,10H,10H-perfluoro-1,10-decanediol, 1H,1H,12H,12H-perfluoro-1,12-dodecanediol, 1H,1H,16H,16H-perfluoro-1,16-hexadecanediol, 1H,1H,8H,8H-perfluorotetraethyleneglycol, fluoropoly(alkylene) diol, ethoxylated fluoropoly(alkylene)diols, fluoropolyether diols, ethoxylated fluoropolyether diols, HOCH$_2$CH$_2$C$_4$F$_8$CH$_2$CH$_2$OH, F(CF$_2$)$_6$CH$_2$CH(OH)CH$_2$OH, F(CF$_2$)$_7$CON(C$_2$H$_4$OH)$_2$, 1H,1H,9H,9H-perfluoro-1,9-nonanediamine, 1H,2H,3H,3H-perfluorononane-1,2-diamine, 1H,1H,10H,10H-perfluoro-1,10-decanediamine, 1H,1H,12H,12H-perfluoro-1,12-dodecanediamine, 1H,1H,16H,16H-perfluoro-1,16-hexadecanediamine, fluoropoly(alkylene) diamine, ethoxylated fluoropoly(alkylene) diamines, fluoropolyether diamines, ethoxylated fluoropolyether diamines, 1H,1H,9H,9H-perfluoro-1,9-nonanediisocyanate, 1H,2H,3H,3H-perfluorononane-1,2-diisocyanate, 1H,1H,10H,10H-perfluoro-1,10-decanediisocyanate, 1H,1H,12H,12H-perfluoro-1,12-dodecanediisocyanate, 1H,1H,16H,16H-perfluoro-1,16-hexadecanediisocyanate, fluoropoly(alkylene) diisocyanate, ethoxylated fluoropoly(alkylene) diisocyanates, fluoropolyether diisocyanates, ethoxylated fluoropolyether diisocyanates, tetrafluorophenylene diisocyanates, 6-chloro-2,4,5-trifluorobenzene-1,3-diisocyanate, and fluoropoly(oxyalkylene) difunctional compounds having the structures: YCH$_2$CF$_2$O[(CF$_2$)$_2$O]$_x$CF$_2$CH$_2$Y, YCH$_2$(CF$_2$)$_3$O[(CF$_2$)$_4$O]$_x$C$_3$F$_6$CH$_2$Y, YCH$_2$CF$_2$O[(CF$_2$)$_2$O]$_x$[(CF$_2$)$_4$O]$_y$[(CF$_2$)$_2$O]$_x$CF$_2$CH$_2$Y, YCH$_2$CF$_2$O[(CF$_2$)$_2$O]$_x$[(CF$_2$)$_3$O]$_y$CF$_2$CF$_2$O[(CF$_2$)$_3$O]$_y$[(CF$_2$)$_2$O]$_x$CF$_2$CH$_2$Y, and YCH$_2$(CF$_2$)$_2$O[(CF$_2$)$_3$O]$_x$(CF$_2$)$_2$CH$_2$Y where x and y are independent integers.

Fluorinated telechelics include fluorinated polyether telechelics (e.g., polyethylene glycols, polypropylene glycols, polyethylenepropylene glycols, polytetramethylene glycols, poly(tetrahydrofuran-co-3-methyl-tetrahydrofuran) glycols), such as those having a structure of Y(CH$_2$)$_z$CF$_2$O[(CF$_2$)$_m$O]$_n$[(CF$_2$)$_x$O]$_y$CF$_2$(CH$_2$)$_z$Y, YCH$_2$CF$_2$O[CF$_2$CF(CF$_3$)O]$_n$CF$_2$CH$_2$Y, or YCH$_2$CF$_2$O(CF$_2$CF$_2$O)$_n$CF$_2$CH$_2$Y, where z is 1 or 2, m, n, x, and y are chosen so that the M$_w$ of the fluoroether difunctional compound can be 400 or more, or 500 or more, or 1,000 or more, or 2,000 or more, or 3,000 or more, preferably 5,000 or less, or 3,000 or less, or 2,000 or less, the ratio of n/y can be 0.9 or more, or 1 or more, like YCH$_2$CF$_2$O[(CF$_2$)$_2$O]$_6$[CF$_2$O]$_6$CF$_2$CH$_2$Y.

Another group of perfluoropolyether telechelics comprises a structure of:

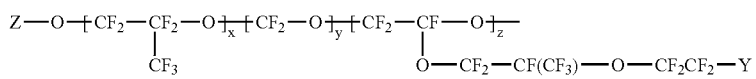

or —CF$_2$O(CF$_2$O)$_x$(CF$_2$CF$_2$O)$_y$CF$_2$—, where Z is the same or different monovalent radicals of —CF$_3$ or —CF$_2$Y'; Y' is the same or different radicals each comprising one or more Y functional groups; and x, y, and z are the same or different numbers of 1-200. Non-limiting examples of Y' include —CH₂Y, —CH₂(OCH₂CH₂)ₙY, —CH₂OCH₂CH(Y)CH₂Y, the structures of any polyisocyanates as disclosed herein in which one of the NCO group is replaced with an amide linkage (i.e. —CONH—), such as:

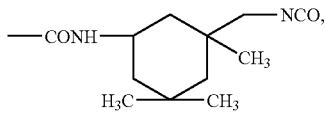

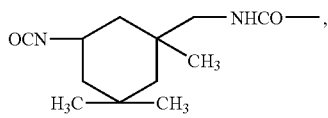

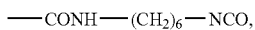

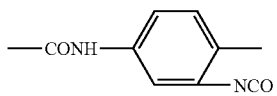

as well as

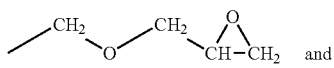

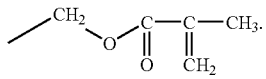

Another group of fluorinated polyfunctional compounds having a number average molecular weight of 400-7,000 may comprise the structure $Y_m R'$—$(R'')_n$—$(R''')_n$—$R_f''$—$(R''')_n$—$(R'')_n$—$R'Y_m$, where $R_f''$ is a linear or branched, random or block, (per)fluoropolyether divalent radical, having a structure of —$CF_2CH_2(OCF_2CF_2CH_2)_p OR_fO(CH_2CF_2CF_2O)_q CH_2CF_2$— or —$[CF(CF_3)OCF_2]_p R_f[CF_2OCF(CF_3)]_q$— where R is a linear or branched divalent $C_{1-10}$ fluoroalkylene and p/q is 0.8-1.2, or a structure of —$CF_2O(C_2F_4O)_r(CF_2O)_s CF_2$— where r is at least 4 (or 5-20, 6.4-18.5, 8-12, or about 10.3), s is at least 4 (or 5-15, 5.9-13.9, 8-12, or about 10.3), r+s is at least 20 (or 200 or less), and r/s is 0.2-5 (or 0.2-2, 0.3-1.5, 0.5-1.4, or about 1), or a structure of —$CF_2[CF_2CF(CF_3)O]_t(C_2F_4O)_u(CFXO)_v CF_2$— where X is the same or different radical of —F or —$CF_3$, t/u is 0.6-2, u/v is 10 or greater, or any other fluorine-containing divalent radicals as disclosed herein, or a combination of two or more thereof; R" and R'" are the same or different divalent radicals of —$CH_2$—, —$CH_2O$—, —$CH_2OCH_2$—, —CONH—, —$CON(CH_3)$, —O—, —$CH_2OSO_2$—, —CH(OH)—, —$CH_2OSi(R^1)(R^2)$OCONH—, —$CH_2(OCH_2CH_2O)_w$— or —$CH_2(OCH_2CH_2O)_w CONH$— where w is 1-10 and $R^1$ and $R^2$ are the same or different linear or $C_{1-4}$ alkyls (i.e. methyl, ethyl, propyl, isopropyl, butyl, iso-butyl, sec-butyl, or tert-butyl); R' is the same or different, linear or branched, divalent or trivalent radicals, such as $C_{1-20}$ or $C_{2-12}$ aliphatic radicals (e.g., alkylenes like —$(CH_2)_6$—), or $C_{6-20}$ aromatic or alicyclic radicals (e.g.,

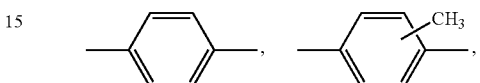

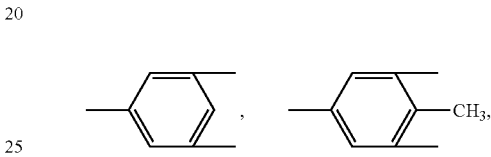

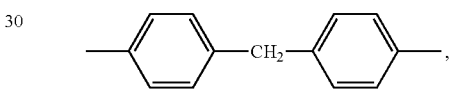

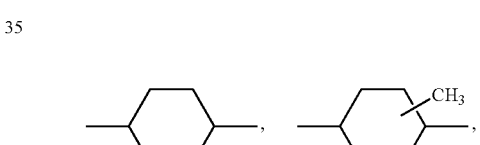

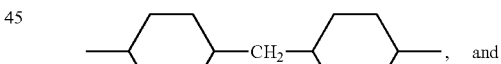

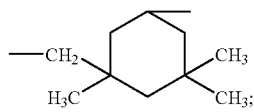

n is the same or different number of 0 or 1; and m is the same or different numbers of 1, 2, or greater.

Another group of fluorinated polyfunctional compounds may comprise the general structure $R_f[R_x(CH_2CH_2O)_p R_n Y]_2$, where $R_f$ is chosen from linear or branched, random or block, homopolymeric or copolymeric, (per)fluoropolyether radicals, any fluorine-containing divalent radicals such as those disclosed herein, and combinations of two or more thereof; R is the same or different linear or branched divalent radicals, such as $C_{1-20}$ aliphatic alkylenes, $C_{3-20}$ cycloaliphatic radicals, $C_{4-20}$ aliphatic-cycloaliphatic radicals, $C_{5-30}$ aromatic radicals, and $C_{6-30}$ aliphatic-aromatic radicals, optionally R has one or more heteroatoms (e.g., O, S, N, P, Si); Y is the functional group as described before; n is the same or different whole numbers of 0 to 10; p is the same or different whole numbers of 0 to 6, or 1 to 5; and x is the same or different integers of 1 to 10. In one example, $R_f$ has a structure of —$OCH_2$—CFX—$OR_f''$—CFX—$CH_2O$—, where $R_f''$ is a (per)fluoropolyether chain comprising repeating oxyfluoroalkylene units of —$CF(CF_3)O$—, —$CF_2O$—, —$CF_2CF(CF_3)O$—, or combinations of two or more thereof; and X is the same or different radicals of —F or —$CF_3$. In another example, n and x are all 0. Such fluorinated compounds may have a number average molecular weight of 400-10,000.

Another group of polyfunctional compounds have the structure of Y—$R^1{}_m$—$R_f$—$R^2{}_n$—Y, where $R_f$ is a divalent radical of —$CF_2O[CF_2CF(CF_3)O]_xR_f''O[CF(CF_3)CF_2O]_y$ $CF_2$—, —$CF_2(OC_2F_4)_x(OCF_2)_y$—, —$CF_2O(C_2F_4O)_w$ $(CF_2O)_x[CF(CF_3)CF_2O]_y[CF(CF_3)O]_zCF_2$—, —$CF_2O$ $[CF_2CF(CF_3)O]_x(CFXO)_yCF_2$—, —$CF_2O[CF_2CF(CF_3)O]_x$ $CF_2$—, —$CF_2O(C_2F_4O)_xCF_2$—, —$CF_2O(C_3F_6O)_xCF_2$—, —$CF_2O(C_2F_4CH_2O)_xCF_2$— or —$CF_2O(C_2F_4CH_2O)_xR_f''O$ $(CH_2C_2F_4O)_yCF_2$—, where $R_f''$ is a divalent perfluoroalkylene radical such as those disclosed herein, X is the same or different radicals of —F or —$CF_3$; $R^1$ and $R^2$ are the same or different radicals of —$(CH_2)_pOCH_2$—, —$[(CH_2O)_p$ $CH_2]$—, or —$CH_2)_p$— where p is 1, 2, 3, or 4; and m, n, w, x, y, and z are the same or different numbers such that the polyfunctional compound has a number average molecular weight of about 400-7,000.

Another group of fluorinated polyfunctional compounds have the structure of $HO(CH_2)_xC_yF_z(CH_2)_xOH$ where x is 0, 1, or 2, y is 2, 3, 4, 5, 6, 7, 8, 9, 10, 11, 12, 13, 14, 15, or greater, z equals 2y or 2(y-1), and the divalent radical —$C_yF_z$— comprises a linear, branched, or cyclic perfluorinated structure.

Another group of fluorinated polyfunctional compounds may be formed at least in part from one or more partially fluorinated or perfluorinated ethylenically unsaturated monomers (e.g., fluoroolefins), optionally in addition to non-fluorinated ethylenically unsaturated monomers (e.g., olefins). Suitable linear or branched fluorinated monomers include, without limitation, $C_{2-20}$ or $C_{8-18}$ fluoromonoenes (e.g., vinylidene fluoride, vinyl fluoride, fluoroethylenes, di-, tri-, and tetra-fluoroethylenes, chlorotrifluoroethylene, 1,2-dichlorodifluoroethylene, 1-chloro-1-fluoroethylene, perfluorobutyl ethylene, fluoropropylenes, di-, tri-, tetra-, penta-, and hexa-fluoropropylenes, fluorostyrenes, di-, tri-, tetra-, penta-, and per-fluorostyrenes, fluoroalkyl α-olefins like 3,3,4,4,4-pentafluoro-1-butene, 3,3,3-trifluoropropene, 1-hydropentafluoropropene, 2-hydropentafluoropropene, and 2-trifluoromethyl-3,3,3-trifluoro-1-propene, $R_f'C$ $(R^1)=C(R^2)R^3$ where $R_f'$ is —F or linear or branched $C_{1-12}$ fluoroalkyl having 1-25 fluorine atoms, like —$CF_3$ or —$C_4F_9$, or a $C_{6-12}$ fluroaryl having 1-17 fluorine atoms, like $C_6F_5$, $R^1$, $R^2$, and $R^3$ are the same or different radicals chosen from H, linear or branched $C_{1-12}$ alkyls and $C_{1-12}$ fluoroalkyls having 1-25 fluorine atoms, like $CH_3$, $C_2H_5$ or n-$C_3H_7$, and $C_{6-12}$ aryls and $C_{6-12}$ fluoroaryls having 1-17 fluorine atoms, like $C_6H_5$); $C_{3-30}$ fluorovinyl ethers (e.g., perfluoro(methylvinylether), perfluoro(ethylvinylether), perfluoro(propylvinylether), 1,1,1-tris(4-trifluorovinyloxyphenyl)ethane, 9,9-bis(4-trifluorovinyloxyphenyl)fluorene, 4,4'-bis(4-trifluorovinyloxy)biphenyl, 2,2-bis(4-trifluorovinyloxyphenyl)-1,1,1,3,3,3-hexafluoropropane, 1-bromo-4-(trifluorovinyloxy)benzene, 1,2,2-trifluorovinyl phenyl ether, 2,3,4,5,6-pentafluorophenyl-1,2,2-trifluorovinyl ether 2,3,4,5,6-pentafluorophenyl allyl ether); $C_{3-10}$ fluorodioxoles (e.g., perfluoro(1,3-dioxole), 2,2,4,5-tetrafluoro-1,3-dioxole, perfluorodimethyldioxole, perfluoro-4-alkyl-1,3-dioxoles, perfluoro-4-methyl-1,3-dioxole, perfluoro-2,2,4-trimethyl-1,3,-dioxole, perfluoroalkoxy dioxoles, perfluoro-4-methoxy-1,3-dioxole, 2,2,4-trifluoro-5-trifluoromethoxy-1,3-dioxole); $C_{4-18}$ fluorodienes (e.g., 1-fluorodienes, fluorinated derivatives of butadiene and/or isoprene, $R^1C$ $(R^2)=C(R^3)$—$C(R^4)=C(R^5)R^6$ where $R^1$, $R^2$, $R^3$, $R^4$, $R^5$, and $R^6$ are the same or different radicals chosen from H, F, linear or branched $C_{1-4}$ fluoroalkyls having 1, 2, 3, or more fluorine atoms, $C_{1-6}$ alkyl, $C_{1-6}$ alkoxy, and $C_{6-10}$ aryl, and at least one of $R^1$ to $R^6$ is not a hydrogen, such as $CH_2=CF$—$C(CH_3)=CH_2$, $CF_2=CF$—$CF=CF_2$, $CF_2=CF$—$CH=CH_2$, $CF_2=CH$—$CH=CF_2$, $CF_2=CF$—$CH=CF_2$, $CF_2=CF$—$C(CH_3)=CF_2$, $CF_2=CF$—$C(CF_3)=CF_2$, $CH_2=CH$—$C(CF_3)=CH_2$, $CH_2=CF$—$C(OCH_3)=CH_2$, $CH_2=CH$—$CF=CH$—$C_6H_4$, $CF_2=CF$-Z-$CF=CF_2$ where Z is radical chosen from —$O(CH2)m(CF2)n$— where m is 0 or 1 and n is 0 or integer of 1-6, and linear or branched $C_{1-3}$ perfluoroalkylenes, fluoroacrylics (e.g., 1,1-dihydropentadecafluorooctylacrylate and 1,1-dihydropentadienefluorooctylacrylate); perfluoroalkoxy; fluorosilicons; perfluorocyclics; and combinations of two or more thereof.

Suitable linear or branched non-fluorinated monomers include, without limitation, monoenes (e.g., ethylenes, propylenes, butylenes, styrenes); vinyl ethers (e.g., methylvinylether, ethylvinylether); $C_{3-10}$ dioxoles (e.g., 1,3-dioxoles); $C_{4-18}$ dienes (e.g., conjugated or non-conjugated, like 1,3-butadiene, 1,3-pentadiene, 1,3-hexadiene, 1,4-hexadiene, 1,3-heptadiene, 2,4-heptadiene, 1,3-octadiene, 2,4-octadiene, 3,5-octadiene, isoprene, 2,3-dimethyl-1,3-butadiene, 2-methyl-1,3-hexadiene, 3-methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene); acrylics; and combinations of two or more thereof. In one example, the fluorinated polyfunctional compound has a structure of $Y(CH_2)_x[CF(CF_3)CF_2]_yC_zF_2z[CF(CF_3)CF_2]y(CH_2)_zY$, where x is the same or different numbers of 0, 1, 2, 3, or 4, y is the same or different numbers of 1 to 200, and z is an integer of 2, 3, 4, or greater.

The polyfunctional compounds may be telechelics comprising one or more homopolymeric, copolymeric, or terpolymeric segments, such as polyethers having the same or different repeating units of —$(O—R_f)_x$—, polyesters having the same or different repeating units of —$(O—R_f$—$CO)_x$—, polycarbonates having the same or different repeating untis of —$(O—R_f$—$O$—$CO)_x$—, polyamides having the same or different repeating units of —$(NH—R_f$—$CO)_x$—, polyolefins having the same or different repeating units of —$(R_f)_x$—, polysiloxanes having the repeating units of —$[O$—$Si(R_f)_2]_x$—, where $R_f$ is the same or different, saturated or unsaturated, divalent radicals each comprising any one or more of the fluorine-containing radicals disclosed herein, and x is at least 2, or 5 or greater, or 10 or greater, preferably 200 or less, or 100 or less, or 50 or less.

Polyoxyfluoroalkylene difunctional compounds having a weight average molecular weight of 1,500-15,000 may comprise at least one of the following generic structures: $Y_1$—$(CH_2OCH_2)_x$—$(CF_2OCF_2)_y(OCF_2)_z$—$(CH_2OCH_2)_x$—$Y_2$, $Y_1CF_2$—$(C_3F_6O)_p$—$(C_2F_4O)_q$—$(CFXO)_r$—$CF_2Y_2$, $Y_1$ $CF_2$—$(CH_2OC_2F_4)_m$—$CH_2OR_f''OCH_2$—$(C_2F_4OCH_2)_n$—$CF_2Y_2$, and $Y_1$—$[CF(CF_3)OCF_2]_b$—$(R_f'')_a$—$[CF_2OCF(CF_3)]_d$—$Y_2$ X is —F or —$CF_3$; p, q, and r are independently 0-100, p+q>0; $R_f''$ is a divalent fluoroaliphatic radical, such as a perfluoroalkylene radical, comprising 1-21 carbon atoms, such as 1-4 carbon atoms, optionally comprising heteroatoms, such as 2-4 O and/or N atoms; m and n are independently 1-100; $Y_1$ and $Y_2$ are independent radicals each comprising at least one Y group, such as —CH$_2$OH; a is 0 or 1; b and d are independently 2-100. Non-limiting examples of relatively short fluorinated difunctional and trifunctional compounds include α,ω-fluoropolyether diols, diamines, and diisocyanates having a molecular weight of 400-500, CF$_2$ and C$_2$F$_4$ telomers with Y end groups, such as those having the structure Y—(CH$_2$)$_m$—(CF$_2$)$_n$—(CH$_2$)$_m$—Y where m is 1 or 2, n is 1-20, like ethylene-fluoroalkyleneethylene diols (e.g., 2,2,3,3-tetrafluorobutane-1,4-diol, 2,2,3,3,4,4,5,5-octafluorohexane-1,6-diol, (CF$_2$)$_4$(CHFCF$_2$CH$_2$OH)$_2$), 3,3,4,4-tetrafluorohexane-1,6-diol, 3,3,4,4,5,5,6,6-octafluorooctane-1,8-diol, 3,3,4,4,5,5,6, 6,7,7,8,8-dodecafluorodecane-1,10-diol, 3-trifluoromethyl-3,4,4,5,5,6,6,7,7,8,8-undecafluorodecane-1,10-diol, 4-trifluoromethyl-3,3,4,4,5,5,6,6,7,7,8,8-undecafluorodecane-1,10-diol, 3,3,4,4,5,5,6,6,7,7,8,8,9,9,10,10-hexadecafluorododecane-1,12-diol, 3,5-di(trifluoromethyl)-3,4,4,5,6,6,7,7,8,8,9,9,10,10-tetradecafluorododecane-1,12-diol, 3,10-di(trifluoromethyl)-3,4,4,5,5,6,6,7,7,8,8,9,9,10,-tetradecafluorododecane-1,12-diol, fluorinated dioxadecane-1,10-diols, m-C$_6$H$_4$[C(CH$_3$)$_2$OH]$_2$, p-C$_6$H$_4$[C(CH$_3$)$_2$OH]$_2$, hexafluorobisphenol A, HOCH$_2$CH(OH)CH$_2$OCH$_2$CF$_2$O(C$_2$F$_4$O)$_r$(CF$_2$O)$_s$CF$_2$CH$_2$OCH$_2$CH(OH)CH$_2$OH, HOCH$_2$CH$_2$(CF$_2$)$_n$CH$_2$CH$_2$OH (n being 1, 2, 3, 4, 5, 6, up to 20), fluorinated aliphatic diamines such as ethylene-fluoroalkylene-ethylene diamines, 3,3,4,4-tetrafluorohexane-1,6-diamine, 3,3,4,4,5,5,6,6-octafluorooctane-1,8-diamine, 3,3,4,4,5,5,6,6,7,7,8,8-dodecafluorodecane-1,10-diamine, 3-trifluoromethyl-3,4,4,5,5,6,6,7,7,8,8-undecafluorodecane-1,10-diamine, 4-trifluoromethyl-3,3,4,4,5,5,6,6,7,7,8,8-undecafluorodecane-1,10-diamine, 3,3,4,4,5,5,6,6,7,7,8,8,9,9,10,10-hexadecafluorododecane-1,12-diamine, 3,5-di(trifluoromethyl)-3,4,4,5,6,6,7,7,8,8,9,9,10, 10-tetradecafluorododecane-1,12-diamine, 3,10-di(trifluoromethyl)-3,4,4,5,5,6,6,7,7,8,8,9,9,10,-tetradecafluorododecane-1,12-diamine, 1,6-di(2,2,3,3,3-pentafluoropropylamino)hexane, and 1,6-di(1H,1H-perfluorooctylamino)hexane, ethylene-fluoroalkylene-ethylene diisocyanates (e.g., 2,2,3,3,4,4,5,5-octafluorohexane-1,6-diisocyanate), 3,3,4,4-tetrafluorohexane-1,6-diisocyanate, 3,3,4,4,5,5,6,6-octafluorooctane-1,8-diisocyanate, 3,3,4,4,5,5,6,6,7,7,8,8-dodecafluorodecane-1,10-diisocyanate, 3-trifluoromethyl-3,4,4,5,5,6,6,7,7,8,8-undecafluorodecane-1,10-diisocyanate, 4-trifluoromethyl-3,3,4,4,5,5,6,6,7,7,8,8-undecafluorodecane-1,10-diisocyanate, 3,3,4,4,5,5,6,6,7,7,8,8,9,9,10,10-hexadecafluorododecane-1,12-diisocyanate, 3,5-di(trifluoromethyl)-3,4,4,5,6,6,7,7,8,8,9,9,10,10-tetradecafluorododecane-1,12-diisocyanate, 3,10-di(trifluoromethyl)-3,4,4,5,5,6,6,7,7,8,8,9,9,10,-tetradecafluorododecane-1,12-diisocyanate, the like, as well as

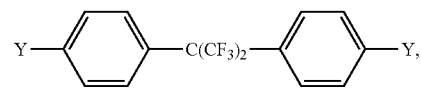

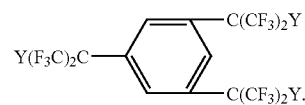

Fluorinated and perfluorinated diols and higher polyols can react with a multifunctional compound to form suitable fluorinated polyols, which can then be converted to corresponding polyamines and polyisocyanates. The multifunctional compound may have a generic structure of A(G)$_m$ where A is a divalent or higher polyvalent radical, G is the same or different monovalent radical each having one hydroxy-reactive functional group, and m is at least 2, or at least 3, or 3-6. Prior to the reaction, the equivalent ratio of total hydroxyl groups in the fluorinated polyol to total hydroxy-reactive functional groups in the multifunctional compound can be at least 1.5, or 2 or more, or 2.5 or more, or 5 or more, or 8 or more, preferably 12 or less, or 8 or less, or 5 or less or 2.5 or less. The resulting fluorinated polyfunctional compound may have a generic structure of A(G)$_{m-n}$[L-(R)$_p$—R$_f''$—(R)$_p$—Y]$_{q \times n}$ where L is a divalent radical formed from the reaction between the G radical and the OH group, which may comprise a ether linkage, an ester linkage, or a urethane linkage; $R_f''$ is a divalent or higher polyvalent radical chosen from monomeric or polymeric, linear or branched, perfluorinated alkylene, oxyalkylene, arylene, oxyarylene, any other fluorine-containing radicals as disclosed herein, and combinations of two or more thereof; R is the same or different divalent radicals chosen from monomeric or polymeric, linear or branched, alkylene, oxyalkylene, alkylene sulfide, arylene, oxyarylene, arylene sulfide, siloxane, and combinations of two or more thereof, such as those disclosed herein; p is the same or different numbers chosen from 0 and 1; q is at least 2, or at least 3; $m \geq n \geq 1$. The reaction product may include one or more of:

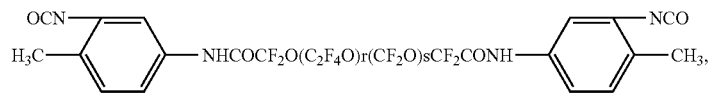

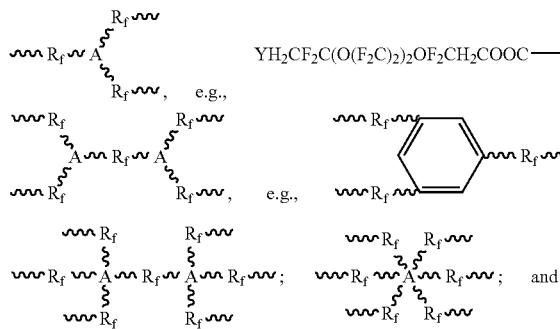
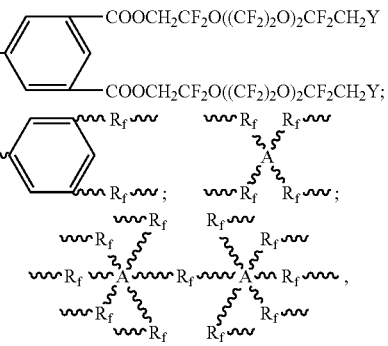

where each free end of may be terminated with a Y functional group as described herein.

When the G radical has a carboxylic acid, acid chloride, anhydride, or ester, the resulting L radical contains an ester linkage. Non-limiting examples of such multifunctional compound include multifunctional acids such as 1,3,5-cyclohexanetricarboxylic acid, Kemp's triacid, 1,2,3-benzenetricarboxylic acid, 1,2,4-benzenetricarboxylic acid, 1,3,5-benzenetricarboxylic acid, 5-(4-carboxy-2-nitrophenoxy)-isophthalic acid, 1,2,3,4-butanetetracarboxylic acid, tetrahydrofuran-2,3,4,5-tetracarboxylic acid, 2,2',2'',2'''-[1,2-ethanediylidene-tetrakis(thio)]-tetrakisacetic acid, cyclobutanetetracarboxylic acid, 1,2,4,5-benzenetetracarboxylic acid, mellitic acid, 1,4,5,8-naphthalene tetracarboxylic acid, and 1,2,3,4,5,6-cyclohexanehexacarboxylic acid; multifunctional esters such as methyl, ethyl or butyl esters of the above acids and triethylmethanetricarboxylate, triethyl-1,1,2-ethanetricarboxylate, tetraethyl-1,1,2,2-ethanetetracarboxylate, tetraethylethylenetetracarboxylate, tetramethyl-exo,exo-tetracycloundeca-3,8-diene-3,4,8,9-tetracarboxylate, and pentamethyl-cyclopentadiene-1,2,3,4,5-pentacarboxylate; anhydrides such as 1,2,4-benzenetricarboxylic anhydride, 1,2,4,5-benzenetetracarboxylic dianhydride, and bicyclo[2,2,2]oct-7-ene-2,3,5,6-tetracarboxylic anhydride; and acid chlorides such as 1,3,5-benzenetricarbonyl chloride.

The G radical may have a halide or other radical that reacts with OH group to form an ether linkage in the resulting L radical. Non-limiting examples of such multifunctional compound include α,α-2,3,5,6-hexachloro-p-xylene, 1,3-dichloro-2-(chloromethyl)-2-methylpropane, 1,1,1-tris-(chloromethyl)-propane, 2,4,6-tris(bromomethyl) mesitylene, pentaerythrityl tetrachloride, pentaerythrityl tetrabromide, 1,2,4,5-tetrakis(bromomethyl)-benzene and hexakis(bromomethyl)benzene.

The multifunctional compound may alternatively have at least one, or 2 or more, or 3 or more, or 4 or more hydroxyl groups, and a hydroxy-reactive group chosen from carboxylic acid, carbonyl halide, alkyl carboxylate, and halo group. Non-limiting examples of such multifunctional compound include polyhydroxyl acids such as 2,2-bis(hydroxymethyl) propionic acid, 3-hydoxyl-2,2-bis(hydroxymethyl)propionic acid, 2,2-bis(hydroxymethyl)butyric acid, 4-hydroxy-3,3-bis(hydroxymethyl)butyric acid, and 3,3-bis(hydroxymethyl)butyric acid; and polyhydroxyl alkyl halides such as 2-(bromomethyl)-2-(hydroxymethyl)-1,3-propanediol, 2-(bromomethyl)-2-methyl-1,3-propanediol, 2-(bromomethyl)-2-ethyl-1,3-propanediol, 3-(bromomethyl)-3-methyl-1,5-pentanediol, and 3-(bromomethyl)-3-(hydroxyethyl)-1,5-pentanediol.

Fluorinated polyols may also be formed from fluorinated or perfluorinated dicarboxylic esters or higher polycarboxylic esters and amino monoalcohols or other higher amino polyols (e.g., amino diols, amino triols, and the like). The fluorinated polycarboxylic ester may have the generic structure of $R_f''[(R)_p—COOR']_q$ where $R_f''$ is a divalent or higher polyvalent radical chosen from monomeric or polymeric, linear or branched, perfluorinated alkylene, oxyalkylene, arylene, oxyarylene, any fluorine-containing radicals as disclosed herein, and combinations of two or more thereof; R is the same or different divalent radicals chosen from monomeric or polymeric, linear or branched, alkylene, oxyalkylene, alkylene sulfide, arylene, oxyarylene, arylene sulfide, siloxane, and combinations of two or more thereof, such as those disclosed herein; R' is the same or different monovalent radicals chosen from linear or branched alkyl, aryl, and aralkyl, such as methyl, ethyl, propyl, butyl, isopropyl, tert-butyl, and the like; p is the same or different numbers chosen from 0 and 1; and q is at least 2. The amino polyol may be partially or fully fluorinated, and can have the generic structure of $HN[R''(OH)_m]_n$ where R'' is the same or different radicals chosen from hydrogen and divalent or higher polyvalent, monomeric or polymeric, linear or branched, non-fluorinated, partially fluorinated or perfluorinated alkylene, oxyalkylene, alkylene sulfide, arylene, oxyarylene, arylene sulfide, siloxane, and combinations of two or more thereof, such as those disclosed herein; m is the same or different numbers of at least 1, or 0 when R'' is hydrogen; n is at least 1, and the sum of all m×n is at least 1, or at least 2. The resulting fluorinated polyfunctional compound may have the generic structure of $R_f''[(R)_p—CON(R''Y_m)_n]_q$ where the amide linkages are formed from the esters and the amines.

Non-limiting examples of the fluorinated dicarboxylic ester include dimethyl perfluoroglutarate, dimethyl perfluoroadipate, dimethyl perfluorosuberate, dimethyl perfluoroazelate, dimethyl hexadecafluorosebacate, dimethyl tetracosafluoro-1,10-decanedioate, and fluoropolyether diesters having an average equivalent weight of 500-2,000, a fluorine content of at least 50%, and a glass transition temperature of less than −100° C., such as those from Solvay Solexis of Thorofare, N.J. Non-limiting examples of the amino polyols include N,N-dihydroxyethylamine, N,N-dihydroxypropylamine, N,N-dihydroxybutylamine, serinol, 2-amino-2-ethyl-1,3-propanediol, 2-amino-2-methyl-1,3-propanediol, and tris(hydroxymethyl)aminomethane.

Another group of fluorinated polyfunctional compounds comprise the generic structure of

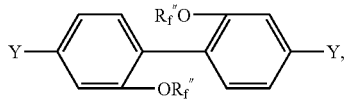

where $R_f''$ can be any fluorine-containing radicals as disclosed herein, such as the same or different, linear or branched, fluorinated or perfluorinated, alkyl or ether radicals comprising 1-18 carbon atoms, which can be free of H or Cl, or optionally having one or more H, Cl, and/or O, like —CF$_3$, —CF$_2$CF$_2$H, —CF$_2$CF$_2$ClOCF$_2$CF$_2$CF$_3$, —CF$_2$CFHOCF$_2$CF$_2$CF$_3$, or combinations of two or more thereof.

Another group of fluorinated polyfunctional compounds may comprise the structure: $Y_1$—(CF$_2$)$_p$—O—$C_qF_{2q}$—O—(CF$_2$)$_p$—$Y_2$ or $Y_1$—(CF$_2$)$_p$—O—(CF$_2$)$_m$—$C_qF_{2q-2}$—(CF$_2$)$_p$O—(CF$_2$)$_p$—$Y_2$, where p is 1-6, or 1-3, q is 5-12, or 5-7, or 6-8, m is 0 or 1, $C_qF_{2q-2}$ represents one or two perfluorinated cycloalkylene radicals, $Y_1$ and $Y_2$ are independent radicals each comprising at least one Y functional group as described herein. such as —CH$_2$OH, —CH$_2$NH$_2$, and —CH$_2$NCO. Non-limiting examples include $Y_1$—(CF$_2$)$_2$—O—(CF$_2$)$_6$—O—(CF$_2$)$_2$—$Y_2$, $Y_1$—(CF$_2$)$_3$—O—(CF$_2$)$_{12}$—O—(CF$_2$)$_3$—$Y_2$, $Y_1$—(CF$_2$)$_2$—O—[C(CF$_3$)]$_2$—O—(CF$_2$)$_2$—$Y_2$, $Y_1$—(CF$_2$)$_2$—CF$_2$—C(CF$_3$)$_2$—CF$_2$—O—(CF$_2$)$_2$—$Y_2$,

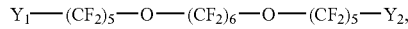

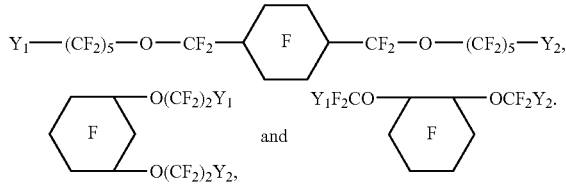

Another group of fluorinated difunctional compounds may have a structure of:

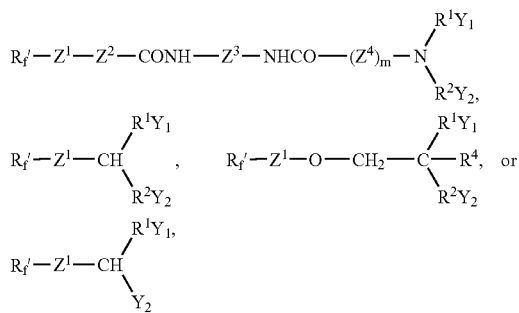

where $R_f^1$ is a fluorinated monovalent radical, such as $C_{1-20}$ linear or branched alkyls or alkenyls; $Z^1$ is a $C_{1-12}$ linear or branched alkylene or alkenylene divalent radical, or —O—C$_6$H$_4$—(CH$_2$)$_n$— where n is a whole number of 0, 1, 2, 3, 4, 5, 6, or greater; $Z^2$ is —O—, —NH—, —R$^3$—NH—, or —N(R$^4$)—, where R$^3$ is a $C_{1-6}$ linear or branched alkylene divalent radical, and R$^4$ is a $C_{1-6}$ linear or branched alkyl; $Z^3$ is a divalent structure of a diisocyanate without NCO groups; $Z^4$ is —N(R$^5$)—R$^6$—, where R$^5$ is H or linear or branched $C_{1-6}$ alkyl monovalent radical, and R$^6$ is a $C_{1-20}$ linear or branched alkylene divalent radical; R$^1$ and R$^2$ are independent divalent radicals, such as $C_{1-12}$ linear or branched aliphatic chains (e.g., alkylenes), alicyclics (e.g., cyclohexylene), aromatics (e.g., phenylene), aliphatic-alicyclics, aliphatic-aromatics, optionally having one or more heteroatoms like O, N, S, or Si in the chain or the ring structures; and m is 0 or 1. Examples of $R_f^1$ includes (CF$_3$)$_2$CF(CF$_2$)$_x$—, CF$_3$(CF$_2$)$_x$—, and HCF$_2$(CF$_2$)$_x$—, where x is a whole number of 0, 1, 2, 3, 4, 5, 6, 7, 8, 9, 10, 11, or greater, or 20 or less, and other fluorinated monovalent radicals disclosed herein. Examples of $Z^1$ include —CH$_2$)$_y$— and —CH═CH—(CH$_2$)$_y$— where y is 1, 2, 3, 4, 5, 6, or greater. Examples of $Z^3$ include the structure of any diisocyanates known to one skilled in the art, and those disclosed herein and in parent applications, such as

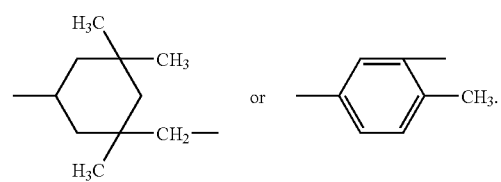

Another group of fluorinated polyfunctional compounds have are random or block copolymer structure of $Y[Z^1OCH_2CH(OH)CH_2O]_m[R_fOCH_2CH(OH)CH_2O]nZ^2Y$ where Y is as described herein; $Z^1$ is a fluorinated or non-fluorinated divalent radical comprising one or more aromatic, cycloaliphatic, and/or polycyclic rings, such as those disclosed herein; $R_f$ is a fluorinated divalent radical such as those disclosed herein; $Z^2$ is $Z^1$ or $R_f$; m is a whole number of 0 to 20; and n is an integer of 1 to 20.

One group of fluorinated polyisocyanates having a number average molecular weight of 500-7,000 may comprise the structure $[(OCN)_mR]_x$-$(Z)_z$—$R_f(Z)_z$—$[R(NCO)_n]_y$, where $R_f$ can be any fluorine-containing divalent radicals as disclosed herein, such as linear or branched, random or block, fluoropolyether or perfluoropolyether radicals, or combinations of two or more thereof; Z is the same or different divalent or trivalent radicals of —CH$_2$—, —O—, —CH$_2$OCH$_2$—, —CH$_2$(OCH$_2$CH$_2$)$_w$CONH—,

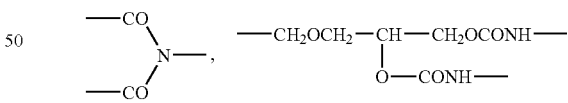

—CH$_2$O—, —CONH—, —CH$_2$OSO$_2$—, —CH$_2$(OCH$_2$CH$_2$O)$_w$—, where w is 1-10, —CH$_2$OSi(R')(R")OCONH— where R' and R" are the same or different linear or branched $C_1$ to $C_4$ monovalent alkyl radicals, and combinations of two or more thereof; R is the same or different linear or branched radicals chosen from divalent $C_{1-20}$ or $C_{2-12}$ aliphatic radicals and divalent or polyvalent aromatic or alicyclic $C_{6-20}$ radicals, such as those disclosed herein; z is independently 0 or 1; x and y are independently 1, 2, or greater; m and n are independently 0, 1, 2, or greater; and m×x+n×y is 2, 3, 4, or greater. Alternatively, fluorinated polyisocyanates can be substantially free of urethane and urea linkages.

Isocyanate-terminated oligomers or polymers include any fluorinated or non-fluorinated oligomers, polymers, prepolymers, or quasi-prepolymers having at least two free reactive isocyanate groups as terminal groups, and optionally more pendant isocyanate groups, on the oligomeric or polymeric backbones. Isocyanate-terminated prepolymers and quasi-prepolymers are well known to the skilled artisan, and include, but are not limited to, the reaction products of any one or combination of two or more of the isocyanates listed above and any one or combination of two or more of the polyols or polyamines disclosed herein. It is well understood in the art that material hardness of polyureas, polyurethanes, and polyurethane/polyurea hybrids may be modified by adjusting the percent NCO content in the isocyanate-terminated prepolymer. Conventionally, the isocyanate-terminated prepolymer has less than about 30% NCO, or no greater than 15% NCO. A percent NCO of about 4% to about 9% may provide a relatively soft elastomer (polyurethane, polyurea, or hybrid thereof) suitable for use in golf ball covers or outer cover layers. A percent NCO of about 7% to about 15% may provide a relatively hard elastomer suitable for use in golf ball intermediate layers, outer core layer, and/or inner cover layers. In the quasi-prepolymer method, the fluorinated polyahl or a blend of two or more thereof may react alone with one or a blend of two or more polyisocyanates (e.g., diisocyanates) to form a fluorinated quasi-prepolymer, thus ensuring full incorporation of the fluorinated polyahls. The fluorinated quasi-prepolymer may then react with one or a blend of two or more non-fluorinated polyahls to form a fluorinated prepolymer, which can later be cured by a curative or a blend thereof into the desirable fluorinated addition polymer material.

Other suitable fluorinated polyfunctional compounds include, without limitation, $YQ_fY$ or $Y(CH_2OCH_2)_pQ_f(CH_2OCH_2)_pY$, where $Q_f$ is a fluorinated divalent radical disclosed herein, such as $-CF_2O(C_3F_6O)_z(C_2F_4O)_x(CFXO)_yCF_2-$, $-CF_2CH_2O(CF_2CF_2CH_2O)_xR_f(OCH_2CF_2CF_2)_zOCH_2CF_2-$, $-[CF(CF_3)OCF_2]CF(CF_3)O]_{x+1}(R_f)_p[CF_2OCF(CF_3)]_{z+1}-$, or a combination thereof, $R_f$ is a fluorinated divalent radical disclosed herein, such as C1-21 or C1-4 fluoroaliphatic or perfluoroalkylene radicals, optionally having 2 to 4 O and/or N atoms in the chain, X is $-F$, $-CF_3$, or a combination thereof, p is 0, 1, 2, or 3, x, y, and z are whole numbers of 0, 1, and up to 100. Optionally, x/y is 0.2 to 2, or 0.3 to 5, or 0.5 to 2.7, or 0.5 to 1.2, x+z is 2 or greater, z/y is 5 to 40, z/x is 0.2 to 6, y/(x+y+z) is 0.1 or less. The fluorinated polyfunctional compound of the present disclosure may have an equivalent weight of 100 to 1,000, preferably 300 to 650. Further compounds include polyamine telechelics having fluorinated backbones and/or N-alkylated fluorinated side chains, polyahl telchelics having fluorinated or perfluorinated vinyl polyolefin backbone, fluoroaliphatic polyacids, fluoroaliphatic polyisocyanate, polyahls comprising fluorocarbon substitution, isocyanates having halogens, polyahls with cyclic or aromatic groups substituted with halogens, poly-acrylate telechelics with fluoride or fluorocarbon, and perfluoroalkyl (e.g., trifluoroethyl, pentafluoropropyl, nonafluorohexyl, or tridecafluorooctyl) substituted polyalkylacrylate polyahls.

Commercially available fluorinated polyols include, but are not limited to, Fluorolink® D, E, and T grades and Fomblin® Z-DOL and Z-TETRAOL grades from Solvay Solexis of Thorofare, N.J. Other partially fluorinated or perfluorinated isocyanates include those described in U.S. Pat. Nos. 4,942,164, 4,863,986, 4,842,939, 4,782,130, and 4,704,420, the disclosures of which are incorporated herein by reference in their entirety. The fluorinated or non-fluorinated polyol telechelics, the fluorinated or non-fluorinated polyamine telechelics, and blend of two, three or more thereof may be reacted with fluorinated or non-fluorinated polyisocyanates at an equivalent ratio of 0.8:1 to 1.2:1 to form polyurethane and/or polyurea, or at an equivalent ratio of 1:1.5 to 1:2.5 to form prepolymer having a NCO content of 30 percent or less, or 15 percent or less.

The fluorinated or perfluorinated polyfunctional compounds of the present disclosure may comprise one, two, or more types of functional groups Y as described above. One example is:

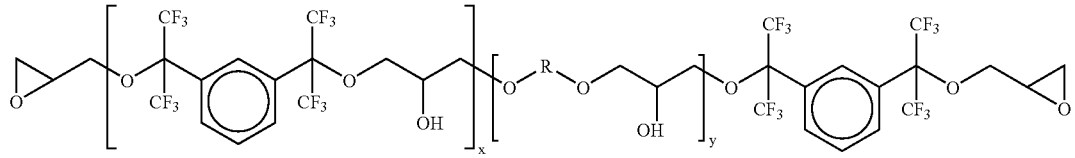

where x and y are independently chosen from 1-100. The polyfunctional compounds may further comprise one or more of other substituted radicals such as, without limitation, hydrocarbon radicals, vinyl radicals, fluorocarbon radicals, monocyclics or polycyclics (e.g., aromatic, alicyclic, vinyl cyclic), ethylenically or acetylinically unsaturated radicals, halides (e.g., chloride, bromide, iodide), and other heteroatom-containing groups such as those containing N, O, S, P, and/or Si, e.g., cyanide, sulfide, silicone, carboxylic acid, carboxylate, sulfonic acid, sulfonate, phosphonic acid, phosphonate, secondary or tertiary amine, N-based cation (e.g., ammonium), polyoxyalkylene, urethane, urea, ether, ester, amide, siloxane, heterocyclics, and others known to one skilled in the art. These radicals may be terminal, pendant, and/or embedded, and provide modification to functionality, reactivity, physical and/or chemical properties of the compounds.

Saturated members of the fluorinated and/or non-fluorinated polyfunctional compounds (aliphatic, alicyclic, or fully hydrogenated) may be used to provide superior light stability when incorporated into the golf ball cover composition. The fluorinated and/or non-fluorinated polyfunctional compounds may be used alone or in any combination of two, three, four, or more thereof. Blending one or more non-fluorinated polyfunctional compounds with one or more fluorinated polyfunctional compounds may advantageously alter the melt temperature of the resulting polymer material, making it more effective at the processing temperatures normally used in golf ball applications, and/or reducing material and manufacturing cost. The choice and quantity of the non-fluorinated polyfunctional compounds used in the blend is at least in part determined by the performance requirements, such as melt temperature and water repellency. Useful ratios of the non-fluorinated polyfunctional compounds to the fluorinated polyfunctional compounds can be 1:0.05, 1:0.1, 1:0.5, 1:1, 1:10, 1:20, 1:100, or any ranges therebetween.

Compositions incorporating one or more fluorinated polyfunctional telechelics and one or more non-fluorinated polyfunctional telechelics may be suitable for applications described herein. Fluorinated polyfunctional telechelics include, but are not limited to, those disclosed herein, such as branch-fluorinated telechelics (e.g., branch-fluorinated polyols or branch-fluorinated polyamines having a molecular weight of 1,000 to 5,000 or 2,000 to 3,500). Non-fluorinated polyfunctional telechelics include, but are not limited to, those described in U.S. patent application Ser. Nos. 10/859,557, 10/434,738, and 10/640,532, the disclosures of which are incorporated herein by reference in their entirety, such as hydrocarbon telechelics (e.g., polyethylene telechelics, polypropylene telechelics), polyether telechelics (e.g., polyoxyethylene telechelics, polyoxypropylene telechelics, polyoxytetramethylene telechelics, particularly those having a molecular weight of 1,000 to 5,000), polyester telechelics (e.g., polyethylene adipate telechelics, polytetramethylene adipate telechelics, polyhexamethylene adipate telechelics, polycaprolactone telechelics), polypolycarbonate telechelics (e.g., polyhexamethylene carbonate telechelics having a molecular weight of 1,000 to 4,000 or 1,500 to 2,500), polysiloxane telechelics (e.g., polyorganosiloxane telechelics), polyethersiloxane telechelics (e.g., polyoxyalkylene-capped polydimethylsiloxane telechelics). The non-fluorianted polyfunctional telechelics may comprise 1% to 75% by weight of the resulting material. In one example, a blend of one or more of the fluorinated polyfunctional telechelics and one or more of the non-fluorinated polyfunctional telechelics may be reacted with one or more polyisocyanates to form an NCO-containing prepolymer. In another example, one or a blend of two or more thermoplastic polyurethanes formed from non-fluorinated polyfunctional telechelics, polyisocyanates, and curatives may be melt-blended with one or more fluorinated polyfunctional telechelics. In a further example, one or a blend of two or more thermoplastic polyurethanes formed from fluorinated polyfunctional telechelics, polyisocyanates, and curatives may be melt-blended with one or more non-fluorinated polyfunctional telechelics. In yet another example, one or more non-fluorinated polyfunctional telechelics and one or more polyisocyanates may form an NCO-containing quasi-prepolymer, preferably having an NCO content of 16% or greater, or 20% or greater, or 25% or greater, or 30% or less, or 25% or less. The quasi-prepolymer may then react with one or more fluorinated polyfunctional telechelics to form a second NCO-containing prepolymer, preferably having an NCO cotent of 15% or less. In further another example, one or more fluorinated polyfunctional telechelics and one or more polyisocyanates may form an NCO-containing quasi-prepolymer, preferably having an NCO content of 16% or greater, or 20% or greater, or 25% or greater, or 30% or less, or 25% or less. The quasi-prepolymer may then react with one or more non-fluorinated polyfunctional telechelics to form a second NCO-containing prepolymer, preferably having an NCO cotent of 15% or less. The fluorinated polyfunctional compound or a combination of two or more thereof may comprise 1% or greater by weight of the total composition, or 3% or greater, preferably 85% or less, or 70% or less, or 60% or less. The non-fluorinated polyfunctional compound or a combination of two or more thereof may comprise 1% or greater by weight of the total composition, or 2% or greater, or 10% or greater, preferably 90% or less, or 80% or less, or 70% or less. The resulting material may have a surface fluorine content (e.g., within 5 nm from the outermost surface of the material) greater than a center fluorine content (e.g., at least 250 nm from the outermost surface of the material).

One or more curing agents, including polyahl telechelics disclosed herein and other polyahls and epoxies described in U.S. patent application Ser. Nos. 10/859,557, 10/434,738, and 10/640,532 and incorporated herein by express reference thereto, may be used in the reactive fluidic composition of the present disclosure for chain-extension and/or crosslink. The curative may be one or a blend of two or more low molecular weight linear or branched polyols (diols, triol, tetraols, etc.), polyamines (diamines, triamines, tetraamines, etc.), and/or amino alcohols, having a molecular weight of 25 to 1,000, or 40 to 500, or 100 to 500, preferably short ones having up to 12 carbon atoms. Curatives having a functionality of greater than 2 (e.g., 3 or more) may be present to impart crosslinks and enhance mechanical properties of the resulting polymer. When co-present, the short difunctional curative and the higher polyfunctional curative may have an equivalent ratio therebetween of 0.1 to 10, preferably 0.5 to 2. Any one or more of the curatives may be partially or fully fluorinated. One group of curatives have the structure

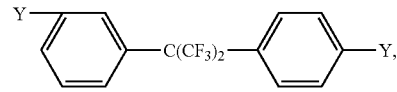

where Y is as described herein. Another group have the structure $R_f(O)x[CH_2CH(OH)CH_2O]_yR$, where $R_f$ is a $C_{1-20}$ linear or branched fluoroalkyl, such as $C_6F_{13}CH_2CH_2$—, R is H or $C_{1-6}$ alkyl having 1-3OH groups, x is 0 or 1, and y is 1, 2, or 3. Saturated curatives may provide satisfactory light stability in cover layers.

Fluorinated polyol curatives include, without limitation, $(CF_2)_{1-20}(CHFCF_2CH_2OH)_2$, $(CF_2)_{1-22}(CF_2CH_2OH)_2$, $(CF_2)_4(CHFCF_2CH_2OH)_2$, 1H,1H,2H,3H,3H-perfluoro-1,2-nonandiol, 3,3,4,4,5,5,6,6-octafluoro-1,8-octanediol, 1H,1H,12H, 12H-perfluoro-1,12-dodecanediol, 2,2-bis(4-hydroxyphenyl)-hexafluoropropane, 1H,1H,7H,7H-tetrahydroperfluoro(2-methyl-3-oxa-heptane)-1,7-diol, 1H,1H,8H, 8H-tetrahydro-perfluoro[2-methyl-3-oxa-octane]-1,8-diol, 2,2-difluoro-1,3-propanediol, 2,2,3,3-tetrafluoro-1,4-butanediol, 2,2,3,3,4,4-hexafluoro-1,5-pentanediol, 2,2,3,3,4,4,5,5-octafluoro-1,6-hexanediol, 2,2,3,3,4,4,5,5,6,6-decafluoro-1,7-heptanediol, 1H,1H,8H,8H-perfluoro-1,8-octanediol, 1H,1H,9H,9H-perfluoro-1,9-nonanediol, 1H,1H,10H,10H-perfluoro-1,10-decanediol, 1H,1H,2H,3H, 3H-perfluoro-1,2-undecanediol.

Fluorinated polyamine curatives include, without limitation, 2-methyl-2-trifluoromethyl-1,3-propanediamine, 2-fluoro-1,3-propanediamine, 2-fluoro-2-methyl-1,3-propanediamine, 2,2-difluoro-1,3-propanediamine, octafluorohexane diamine, tetrafluoro-1,3-phenylene diamine, tetrafluoro-1,4-phenylene diamine, octafluoro-4,4'-diaminobiphenyl, oxy-4,4'-bis(tetrafluoro)aniline, thio-4,4'-bis(tetrafluoro)aniline, sulfonyl-4,4'-bis(tetrafluoro)aniline, difluoromethylene-4,4'-bis(tetrafluoro)aniline, hexafluoro-2,2-propylidene-4,4'-bis(tetrafluoro)aniline, tetrafluoro-1,3-phenylenedioxy-4,4'-bis(tetrafluoro)aniline, octafluoro-4,4'-biphenylenedioxy-4,4'-bis(tetrafluoro)aniline, 2,2'-bis(trifluoromethyl)biphenyl-4,4'-diamine, 1,3-bis(4-amino-2, 3,5,6-tetrafluorophenoxy)-2,4,5,6-tetrafluorobenzene, 5,5', 6,6'7,7'-octafluoro-[1,1']binaphthalenyl-2,2'-diamine, 2,2',3, 3',5,5',6,6'-octafluoro-4,4'-biphenyldiamine, 4,4'-hexafluoroisopropylidene bisaniline, 2,2-bis(3-amino-4-hydroxyphenyl)hexafluoropropane, 2,2'-bis[4-(4-aminophenoxy)phenyl]hexafluoroisopropylidene,

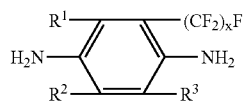

where $R^1$, $R^2$, and $R^3$ are the same or different radicals of H or $-(CF_2)_xF$ and x is the same or different whole numbers of 0, 1, 2, 3, 4, 5, 6, 7, or greater, The fluorinated polymer formed from an addition polymerization reaction of reactants comprising at least one of the fluorinated polyfunctional compounds may have fluorinated radicals in rubber-like blocks, rigid blocks, or both. The rubber-like and rigid blocks preferably are distributed through the polymer in an alternating fashion. The weight ratio of the rigid blocks to the rubber-like blocks may be less than 1, such as 0.8 or less, or 0.7 or less, or 0.5 or less, preferably 0.25 or greater, or 0.33 or greater. Alternatively, the weight ratio of the rigid blocks to the rubber-like blocks may be 1 or greater for producing thermoplastic fluorinated addition polymers, such as 1.5 or greater, or 2 or greater, or 3 or greater, preferably 5 or less, or 4.5 or less. The fluorinated polyfunctional compound may constitute, by weight of the addition polymerization product, 1%, 5%, 10%, 20%, 35%, 50%, 75%, 80%, 90%, up to 100%, or any

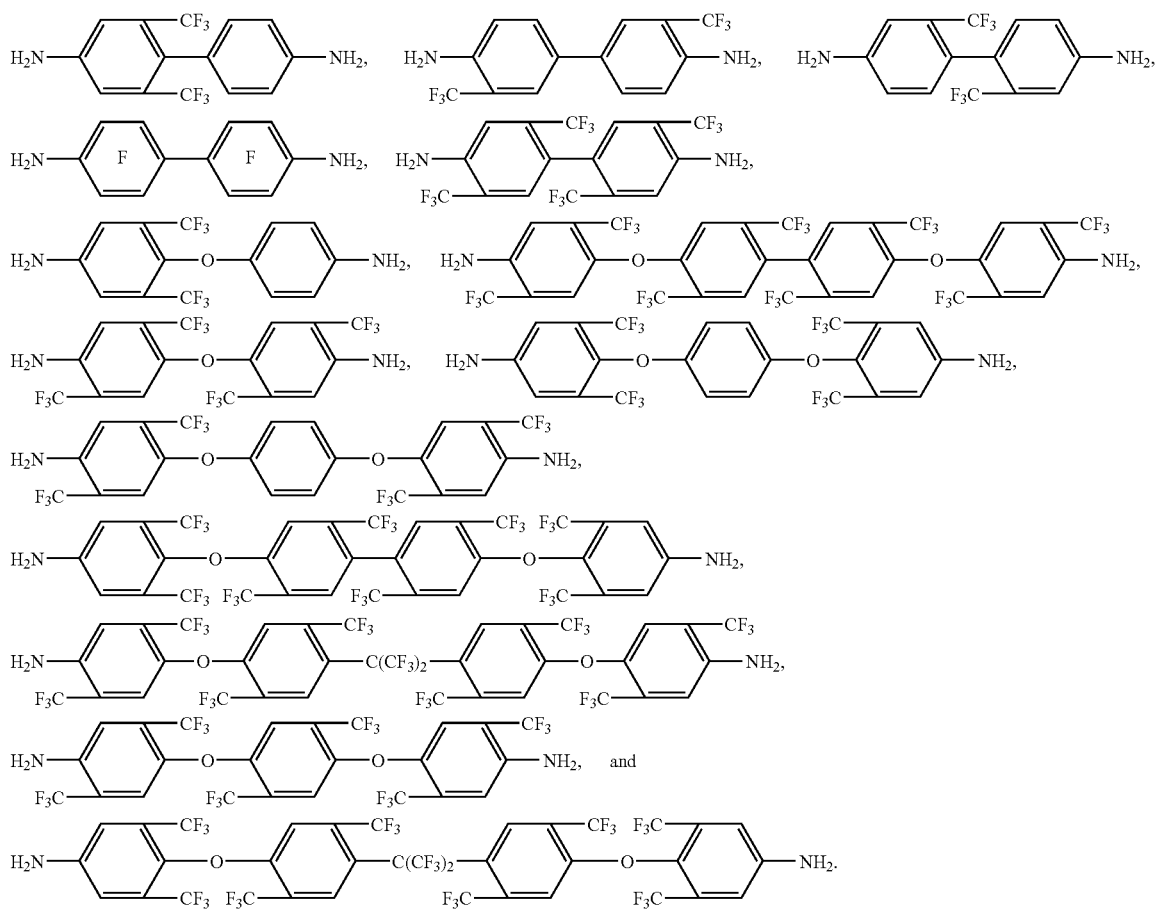

For best light stability, all reactants in the reactive fluidic compositions may be saturated, including the polyahl telechelics, the isocyanates, and the curatives. A hindered secondary diamine having a high level of steric hindrance may be used alone or in combination with other curatives to beneficially slow down the curing process. A curative having a relatively low freezing point may be used as a freezing point depressant. Sterically hindered and/or freezing point depressing curatives include those described in U.S. patent application Ser. Nos. 10/859,557, 10/434,738, and 10/640,532, the disclosures of which are incorporated by reference in their entirety.

ranges therebetween. Fluorine content in the polymer formed from the composition can be 1%, 4%, 5%, 10%, 30%, 50%, 60%, 70%, 75%, 80%, or any ranges therebetween, such as 58% to 64%. To form a prepolymer, the polyol, polyamine, aminoalcohol, or a blend thereof may react with one or more isocyanates at an equivalent ratio of 0.3:1 to 0.6:1, or about 0.5:1. The polyols or polyamines used in the prepolymer may have a relatively high molecular weight of 1,000-30,000, or 1,000-10,000, or 1,000-5,000. The resulting prepolymer may be a polyurethane prepolymer, a polyurea prepolymer, or a polyurethane/polyurea prepolymer. The curing agents, used alone or in combination of two or more thereof, may then cure the prepolymer into a thermoplastic or thermoset polyurethane, polyurea, or polyurea/polyurethane hybrid. An equivalent ratio of the prepolymer to the curing agent may be 1:0.8 to 1:1.2, 1:0.9 to 1:1.1, or 1:0.95 to 1:1.05.

The unique structural and compositional characteristics of the fluorinated polymer materials disclosed herein result in their physical, chemical, thermal, and other properties that are desirable and advantageous in golf ball applications. Being hydrophobic and oleophobic, fluorinated polymers exhibit excellent chemical and thermal stability, good weathering and humidity resistance, low surface energy, and low coefficient of friction. Fluorinated compositions of the present disclosure may further have high adhesion, high abrasion resistance, high tear strength, low index of refraction, and/or low glass transition temperature for foreseeable use in low-temperature environment. The fluorinated polymer materials formed from one, two, three, or more fluorinated polyfunctional compounds as disclosed herein is preferably an elastomer, and may have a fluorine weight percentage % F of 75% or less, or 70% or less, or 60% or less, or 50% or less, or 45% or less, or 40% or less, or 30% or less, and preferably 10% or more, or 20% or more, or 25% or more, or 30% or more, or 40% or more. The fluorinated material may have a low surface energy ($\gamma$ total) of 20 ergs/cm$^2$ or less, or 17 ergs/cm$^2$ or less, or 15 ergs/cm$^2$ or less, or 12 ergs/cm$^2$ or less. The fluorinated material may have a high hydrophobicity, with a water droplet contact angle measured in accordance with ASTM D5946-04 of 100° or greater, 110° or greater, or 120° or greater, or 130° or greater, or 135° or greater. The fluorinated polyfunctional compound may have a low glass transmition temperature $T_g$ of −30° C. or less, −50° C. or less, or −80° C. or less, or −100° C. or less, or, alternatively, a $T_g$ of −35° C. or greater, or −30° C. or greater. The fluorinated material formed therefrom may have a $T_g$ of −40° C. or less, or −45° C. or less, or −50° C. or less, or −60° C. or less, or −80° C. or less, or −90° C. or less. The fluorinated material may be highly heat resistant (i.e., thermally stabile), having a 0% weight loss in air temperature of 200° C. or greater, or 230° C. or greater. The fluorinated material may be formed from one or more prepolymers and one or more curatives. The prepolymer may have a fluorine weight percentage % F of 20% or more, or 30% or more, or 40% or more. The prepolymer may have a polydispersity of 3 or less, or 2.5 or less, or 2.2 or less, or 2 or less, or 1.8 or less, or 1.6 or less. The fluorinated material, or any one or more reactants that form the material, may have fluorinated radicals pendant to a backbone of the material or reactant, or substantially free of such pendant fluorinated radicals or side chains.

A variety of additives can optionally be incorporated into the fluorinated compositions of the present disclosure, such as crosslinking agents (e.g., polyfunctional compound with a functionality of greater than 2, organic peroxides, azo radical initiators, carbon-carbon radical initiators, etc.), catalysts, diluents, UV absorbers, hindered amine light stabilizers, freezing point depressants, vulcanizing agents, cis-to-trans catalysts, organosulfur comoounds, accelerators, fillers (e.g., fluorinated fillers such as polytetrafluoroethylene particles or powders, in an amount of 40 weight % or less, or 38% or less, or 30% or less, or 25% or less, preferably 10% or more, or 15% or more, or 20% or more, like 24%, optionally in blends with TiO$_2$), viscosity modifiers, release agents, plasticizers, compatibilizing agents, coupling agents, dispersing agents, colorants including pigments and dyes, optical brighteners, moisture scavengers, surfactants, lubricants, stabilizers, metals, processing aids or oils, blowing/foaming agents, and any other modifying agents known to one of ordinary skill in the art. These additives may be used alone or in combination of two or more thereof, and are added in amounts sufficient to achieve their specific purposes and desired effects. Conventional materials for golf ball cover, intermediate layer, or core may be blended with the liquid reactive compositions of the present disclosure, by about 1 weight percent to about 95 weight percent of the composition. Such additives and blendable materials include those described in U.S. patent application Ser. Nos. 10/859,557, 10/434,738, and 10/640,532, the disclosures of which are incorporated by reference in their entirety.

One or more golf ball portions, such as barrier layer, intermediate layer, inner cover layer, outer cover layer, or coating layer, may be formed from the thermoplastic or thermoset fluorinated reactive compositions disclosed herein. The layer may be transparent or translucent. The layer may have a WVTR of 1 g·mm/(m$^2$·day) or less, or 0.65 g·mm/(m$^2$·day) or less, or 0.4 g·mm/(m$^2$·day) or less, or 0.2 g·mm/(m$^2$·day) or less, or 0.1 g·mm/(m$^2$·day) or less. The layer may have a modulus of 10,000 psi or more, or 30,000 psi, or 50,000 or more, preferably 100,000 psi or less, or 80,000 psi or less, or 70,000 psi or less, or 50,000 psi or less. The material forming the layer may have a hardness of 80 Shore D or less, or 75 Shore D or less, or 60 Shore D or less, or 55 Shore D or less, and as low as 50 Shore A, preferably 80 Shore A or more, or 30 Shore D or more, or 40 Shore D or more, or 45 Shore D or more, or 50 Shore D or more. The material may have a tensile strength of 30 kg/cm$^2$ or greater. The layer may have any thickness of 0.5 inches or less, or 0.1 or less, or 0.05 inches or less, or 0.03 inches or less, preferably 0.005 inches or more, or 0.01 inches or more, or 0.03 inches or more, or 0.05 inches or more. The layer can have an inner diameter of about 0.5 inches to about 1.7 inches, and an outer diameter of about 0.7 inches to about 1.8 inches. The golf ball compression may be 100 or less, or 90 or less, or 80 or less, or 60 or less, preferably 30 or more, or 50 or more, or 70 or more.

Any method known to one of ordinary skill in the art may be used to produce the layer of the present disclosure, such as one-shot method, prepolymer method, casting, compression molding, reaction injection molding ("RIM"), liquid injection molding ("LIM"), injection-compression molding, retractable pin injection molding ("RPIM"), pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials can provide very thin layers such as outer cover layers that are desirable on golf balls. Other techniques include spraying, dipping, spin coating, or flow coating methods.

The core of the golf balls in the present disclosure may be solid, fluid-filled, gel-filled, or gas-filled. The solid core can be made from any suitable core materials including thermoset plastics, such as natural rubber, polybutadiene, polyisoprene, styrene-butadiene or styrene-propylene-diene rubber, and thermoplastics such as ionomer resins, polyamides, polyesters, or a thermoplastic elastomer. Compositions for solid cores may include a base rubber, a crosslinking agent, an initiator, and an optional organosulfur compound. The base rubber typically includes natural or synthetic rubbers.

One base rubber is 1,4-polybutadiene having a cis-bond of at least about 75%, a Mooney viscosity of at least about 30, a molecular weight of at least about 150,000, and a polydispersity of less than about 4. Examples and amounts of desirable base rubbers (e.g., polybutadienes) and blends thereof, cross-linking agents (e.g., zinc diacrylate), initiators (e.g., dicumyl peroxide), organosulfur compounds (e.g., zinc pentachlorothiophenol), and optional additives such as fillers, antioxidants, accelerators, processing aids or oils, foaming agents, cis-to-trans catalysts, adhesives, coupling agents, stable free radicals, radical scavengers, and scorch retarders are described in U.S. patent application Ser. Nos. 10/859,557, 10/434,738, and 10/640,532, the disclosures of which are incorporated by reference in their entirety. The core or the center therein may have a diameter of 1.65 inches or less, or 1.62 inches or less, or 1.6 inches or less, or 1.58 inches or less, or 1.55 inches or less, or 1.5 inches or less, preferably 0.5 inches or more, or 1 inch or more, or 1.5 inches or more, or 1.53 or more, or 1.55 inches or more, or 1.59 inches or more, or 1.62 or more. The core compression may be 120 or less, or 100 or less, or 80 or less, or 20 or less, preferably 20 or more, or 30 or more, or 40 or more. The core can have a COR of 0.75 or more, or 0.78 or more, or 0.8 or more, or 0.81 or more, or 0.82 or more, preferably 0.82 or less.

One layer of the golf ball may comprise a composition of one or more non-ionomeric acid polymers and/or ionomeric derivatives thereof, with optional fatty acids and/or salts thereof, such as those described in the parent U.S. patent application Ser. Nos. 10/859,557, 10/434,738, and 10/640,532, the disclosures of which are incorporated by reference in their entirety. The intermediate layer may have a modulus of about 1,000 psi to about 150,000 psi, a material hardness of about 20 Shore C to about 80 Shore D, a thickness of about 0.005 inches to about 0.6 inches, and a hardness as measured on the golf ball of less than about 80 Shore D. The intermediate layer may have an outside diameter in the range of 70% to 98% of the finished ball diameter and an inner diameter in the range of 30% to 90% of the finished ball diameter. Alternatively, the intermediate layer may have an inner diameter of 0.5-1.6 inches, and an outside diameter of 1-1.65 inches. The intermediate layer may have a WVTR lower than that of the cover, or 1 g·mm/(m$^2$·day) or less, or 0.4 g·mm/(m$^2$·day) or less.

Golf balls of the present disclosure may have the core and one or more layers chosen from a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, and a foamed layer. At least one of the layers comprises one or more fluorinated reactive compositions of the present disclosure, and the layer may adjoin one or two layers independently having one or more fluorinated compositions or being substantially free of fluorine. By incorporating the fluorinated reactive composition into the cover or an intermediate layer, the core can be protected from moisture absorption. The resulting golf ball may have various desirable physio-mechanical characteristics, such as those described in U.S. patent application Ser. Nos. 10/859,557, 10/434,738, and 10/640,532, the disclosures of which are incorporated by reference in their entirety. For example, the golf ball may have a COR of 0.78 or more, or 0.8 or more, or 0.81 or more, or 0.82 or more, preferably 0.82 or less. The golf ball may have an Atti compression of 30 or more, or 50 or more, preferably 120 or less, or 90 or less. The golf ball may have an overall diameter of 1.76 inches or less, preferably 1.68 inches or more. The golf ball further has a dimple coverage on its outermost surface of 60% or more, or 80% or more, or 90% or more, or 95% or more, or about 100%.

The material compositions of the present disclosure and their application in golf balls are further illustrated in the following non-limiting examples. Specifically, each golf ball of the control group is formed of a polybutadiene-based solid core of about 1.55 inches in diameter, an ionomer-based intermediate layer of about 0.035 inches in thickness, and a polyurea cover of about 0.03 inches in thickness. Each golf ball of the example group is formed of the same core, the same intermediate layer, and a fluorinated polyurethane cover of about 0.03 inches in thickness. Formulations of the two covers, physical and performance properties of the two groups of golf balls, are listed in Table I below.

TABLE I

|  | Example | Control |
|---|---|---|
| Cover Formulation | Fluorinated polyurethane formed from aliphatic fluorinated polycarbonate polyol | Light stable polyurea prepolymer at 7.9% NCO cured with Clearlink 1000 at a ratio of 3:1 |
| Physical Properties |  |  |
| Material Hardness | 66 Shore D | 55 Shore D |
| Flexural Modulus | 66,600 psi | 50,000 psi |
| Compression | 96 | 97 |
| Performance Data |  |  |
| COR at 125 ft/s | 0.804 | 0.805 |

The compositions for golf ball portions as disclosed herein may be used in sporting equipment in general. Specifically, the compositions may be applied in various game balls, golf clubs such as putters and drivers, golf club shafts, and golf shoes, and the like, particularly as components or inserts therein.

All patents and patent applications cited in the foregoing text are expressly incorporated herein by reference in their entirety.

The disclosure described and claimed herein is not to be limited in scope by the specific embodiments herein disclosed, since these embodiments are intended solely as illustrations of several aspects of the disclosure. Any equivalent embodiments and various modifications apparent to those skilled in the art are intended to be within the scope of this disclosure. For example, any fluorinated polyfunctional compounds comprising one, two, three, four, or more of the fluorine-containing radicals of the present disclosure may be suitable for use in any compositions disclosed herein. It is further understood that the various features of the present disclosure can be used singly or in combination thereof. Such modifications and combinations are also intended to fall within the scope of the appended claims.

What is claimed is:

1. A golf ball comprising:
   a core, the core having a first coefficient of restitution of 0.8 or greater at 125 ft/s; and
   at least one layer disposed about the core, the layer having a thickness of 0.005 inches or greater and comprising a fluorinated polyol, wherein the golf ball has a second coefficient of restitution of 0.8 or greater at 125 ft/s;

wherein the fluorinated polyol is a branch-fluorinated polyol comprising at least one monomeric unit of the structure:

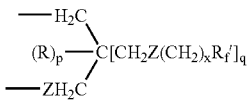

where $R_f'$ is the same or different monovalent linear or branched radicals of $C_{1-20}$ perfluoroalkyls $C_{1-20}$ ω-hydroperfluoroalkyls or $C_{4-60}$ oxaperfluorinated polyethers;

Z is the same or different radicals of —O—, —S—, —NR—, —SO$_2$—, or —N(R)SO$_2$—;

R is the same or different radicals of H or linear or branched $C_{1-6}$ alkyls;

p is 1 when q is 1, or 0 when q is 2; and x is the same or different integers of 1 to 10.

2. The golf ball of claim 1, wherein the layer has a Shore D hardness of 50 to 70.

3. The golf ball of claim 1, wherein the layer has a flexural modulus of 50,000 psi to 80,000 psi.

4. The golf ball of claim 1, wherein the layer is an outer cover layer.

5. The golf ball of claim 1, wherein the layer is an intermediate layer disposed between the core and an outer cover layer.

6. The golf ball of claim 1, wherein branch-fluorinated polyol is a polyol of oligomer, homopolymer, random copolymer, block copolymer, random terpolymer, or block terpolymer.

7. The golf ball of claim 1, wherein the branch-fluorinated polyol further comprises an oxyalkylene unit of the structure—[OR']$_z$—, where R' is a linear or branched $C_{2-20}$ alkylene divalent radical, and z is 1 to 150.

8. A golf ball comprising:

a core, the core having a first coefficient of restitution of 0.8 or greater at 125 ft/s; and at least one layer disposed about the core, the layer having a thickness of 0.005 inches or greater and comprising a fluorinated polyol, wherein the golf ball has a second coefficient of restitution of 0.8 or greater at 125 ft/s;

wherein the fluorinated polyol comprises a fluorinated aliphatic polycarbonate polyol.

9. A golf ball comprising:

a core, the core having a first coefficient of restitution of 0.8 or greater at 125 ft/s; and at least one layer disposed about the core, the layer having a thickness of 0.005 inches or greater and comprising a fluorinated polyol, wherein the golf ball has a second coefficient of restitution of 0.8 or greater at 125 ft/s;

wherein the fluorinated polyol is a branch-fluorinated polyol comprising a polyol of oligomer, homopolymer, random copolymer, block copolymer, random terpolymer, or block terpolymer comprising at least one monomeric unit of the structure:

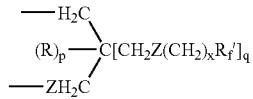

where $R_f'$ is the same or different monovalent liner or branched radicals of $C_{1-20}$ perfluoroalkyls, $C_{1-20}$ ω-hydroperfluoroalkyls, or $C_{4-60}$ oxaperfluorinated polyethers;

Z is the same or different radicals of —O—, —S—, —NR—, —SO$_2$—, or —N(R)SO$_2$—;

R is the same or different radicals of H or linear or branched $C_{1-6}$ alkyls;

p is 1 when q is 1, or 0 when q is 2; and x is the same or different integers of 1 to 10.

* * * * *